(12) United States Patent
Freeman et al.

(10) Patent No.: US 7,875,566 B2
(45) Date of Patent: Jan. 25, 2011

(54) MODIFICATION OF ALKALINE EARTH SILICATE FIBRES

(75) Inventors: Craig John Freeman, Wirral (GB); Gary Anthony Jubb, Wirral (GB)

(73) Assignee: The Morgan Crucible Company PLC (GB)

( * ) Notice: Subject to any disclaimer, the term of this patent is extended or adjusted under 35 U.S.C. 154(b) by 903 days.

(21) Appl. No.: 11/263,655

(22) Filed: Oct. 31, 2005

(65) Prior Publication Data

US 2006/0094583 A1  May 4, 2006

Related U.S. Application Data

(60) Provisional application No. 60/717,516, filed on Sep. 15, 2005.

(30) Foreign Application Priority Data

Nov. 1, 2004 (GB) ................. 0424190.7
Feb. 9, 2005 (GB) ................. 0502701.6

(51) Int. Cl.
*C03C 13/06* (2006.01)
*C03C 13/00* (2006.01)
*C03C 3/087* (2006.01)
*C03C 3/093* (2006.01)

(52) U.S. Cl. ............... 501/36; 501/11; 501/35; 501/68; 501/69; 501/70; 501/55; 501/65; 501/72

(58) Field of Classification Search ........... 501/36, 501/55, 72, 11, 35, 38, 53, 68, 69, 70; C03C 13/16, C03C 3/078, 13/00
See application file for complete search history.

(56) References Cited

U.S. PATENT DOCUMENTS

| | | | |
|---|---|---|---|
| 1,759,919 | A | 5/1930 | Singer |
| 2,051,279 | A | 8/1936 | Thorndyke |
| 2,116,303 | A | 5/1938 | Coss |
| 2,155,107 | A | 4/1939 | Tyler et al. |
| 2,308,857 | A | 1/1943 | Bowes |
| 2,335,220 | A | 11/1943 | Edwards |
| 2,428,810 | A | 10/1947 | Powell |
| 2,520,168 | A | 8/1950 | Powell |
| 2,520,169 | A | 8/1950 | Powell |
| 2,576,312 | A | 11/1951 | Minnick |
| 2,577,431 | A | 12/1951 | Powell |
| 2,823,416 | A | 2/1958 | Powell |
| 3,183,104 | A | 5/1965 | Thomas |
| 3,189,471 | A | 6/1965 | Thomas |
| 3,348,956 | A | 10/1967 | Ekdahl |
| 3,348,994 | A | 10/1967 | Rees et al. |
| 3,380,818 | A | 4/1968 | Smith |
| 3,402,055 | A | 9/1968 | Harris et al. |
| 3,449,137 | A | 6/1969 | Ekdahl |
| 3,459,568 | A | 8/1969 | Rinehart |
| 3,573,078 | A | 3/1971 | Bacon |
| 3,597,179 | A | 8/1971 | Simmons |
| 3,687,850 | A | 8/1972 | Gagin |
| 3,783,092 | A | 1/1974 | Majumdar |
| 3,799,836 | A | 3/1974 | Rogers et al. |
| 3,804,608 | A | 4/1974 | Gaskell et al. |
| 3,804,646 | A | 4/1974 | Dumbaugh, Jr. |
| 3,835,054 | A | 9/1974 | Olewinski et al. |
| 3,854,986 | A | 12/1974 | Chvalovsky et al. |
| 3,887,386 | A | 6/1975 | Majumdar |
| 3,900,329 | A | 8/1975 | Grubb et al. |
| 3,904,424 | A | 9/1975 | Aoki et al. |
| 3,969,121 | A | 7/1976 | Atkinson |
| 4,002,482 | A | 1/1977 | Coenen |
| 4,011,651 | A | 3/1977 | Bradbury |
| 4,014,704 | A | 3/1977 | Miller |
| 4,026,715 | A | 5/1977 | Erickson et al. |
| 4,036,654 | A | 7/1977 | Yale et al. |
| 4,041,199 | A | 8/1977 | Cartwright |
| 4,046,948 | A | 9/1977 | Zlochower |
| 4,047,965 | A | 9/1977 | Karst et al. |
| 4,054,472 | A | 10/1977 | Kondo et al. |
| 4,055,434 | A | 10/1977 | Chen et al. |
| 4,078,939 | A | 3/1978 | Schwochow et al. |
| 4,102,692 | A | 7/1978 | Schartau et al. |
| 4,153,439 | A | 5/1979 | Tomic et al. |
| 4,199,364 | A | 4/1980 | Neely |

(Continued)

FOREIGN PATENT DOCUMENTS

AU  255803  7/1963

(Continued)

OTHER PUBLICATIONS

Brochure showing Manville Corporation entitled "Insulating Fiber Products" for New Superwool™ Product (two pages, undated).

(Continued)

*Primary Examiner*—Melvin C Mayes
*Assistant Examiner*—Jun Li
(74) *Attorney, Agent, or Firm*—Smith, Gambrell & Russell, LLP

(57) ABSTRACT

A method of making refractory alkaline earth silicate fibers from a melt, including the use as an intended component of alkali metal to improve the mechanical properties of the fiber in comparison with a fiber free of alkali metal.

26 Claims, 10 Drawing Sheets

U.S. PATENT DOCUMENTS

| | | | |
|---|---|---|---|
| 4,205,992 A | 6/1980 | Mogensen et al. | |
| 4,238,213 A | 12/1980 | Pallo et al. | |
| 4,251,279 A | 2/1981 | Ekdahl | |
| 4,274,881 A | 6/1981 | Langton et al. | |
| 4,303,722 A | 12/1981 | Pilgrim | |
| 4,325,724 A | 4/1982 | Froberg | |
| 4,330,628 A * | 5/1982 | Cockram et al. | 501/38 |
| 4,342,581 A | 8/1982 | Neubauer et al. | |
| 4,351,054 A | 9/1982 | Olds | |
| 4,363,878 A | 12/1982 | Yamamoto et al. | |
| 4,366,251 A | 12/1982 | Rapp | |
| 4,377,415 A | 3/1983 | Johnson et al. | |
| 4,379,111 A | 4/1983 | Smith et al. | |
| 4,387,180 A | 6/1983 | Jen et al. | |
| 4,430,369 A | 2/1984 | Payne | |
| 4,437,192 A | 3/1984 | Fujiu et al. | |
| 4,443,550 A | 4/1984 | Kume et al. | |
| 4,461,840 A | 7/1984 | Massol et al. | |
| 4,482,541 A | 11/1984 | Telfer et al. | |
| 4,492,722 A | 1/1985 | Ritter, II et al. | |
| 4,542,106 A | 9/1985 | Sproull | |
| 4,555,492 A | 11/1985 | Ekdahl et al. | |
| 4,558,015 A | 12/1985 | Ekdahl et al. | |
| 4,604,097 A | 8/1986 | Graves, Jr. et al. | |
| 4,615,988 A | 10/1986 | Le Moigne et al. | |
| 4,661,134 A | 4/1987 | Hartung | |
| 4,678,659 A | 7/1987 | Drake et al. | |
| 4,693,740 A | 9/1987 | Noiret et al. | |
| 4,778,499 A | 10/1988 | Beaver | |
| 4,830,989 A | 5/1989 | Trivedi et al. | |
| 4,857,489 A | 8/1989 | Bearden | |
| 4,867,779 A | 9/1989 | Meunier et al. | |
| 4,873,209 A | 10/1989 | Gnyra | |
| 4,882,302 A | 11/1989 | Horiuchi et al. | |
| 4,933,307 A | 6/1990 | Marshall et al. | |
| 4,957,559 A | 9/1990 | Tiesler et al. | |
| 5,032,552 A | 7/1991 | Nonami et al. | |
| 5,055,428 A | 10/1991 | Potter | |
| 5,064,785 A | 11/1991 | Kawamoto et al. | |
| 5,108,957 A | 4/1992 | Cohen et al. | |
| 5,121,748 A | 6/1992 | Ditz et al. | |
| 5,135,893 A | 8/1992 | Dohi et al. | |
| 5,217,529 A | 6/1993 | Tiesler et al. | |
| 5,248,637 A | 9/1993 | Taneda et al. | |
| 5,250,488 A | 10/1993 | Thelohan et al. | |
| 5,284,807 A | 2/1994 | Komori et al. | |
| 5,290,350 A | 3/1994 | Besnard et al. | |
| 5,312,806 A | 5/1994 | Mogensen | |
| 5,332,699 A | 7/1994 | Olds et al. | |
| 5,346,868 A | 9/1994 | Eschner | |
| 5,401,693 A | 3/1995 | Bauer | |
| 5,407,872 A | 4/1995 | Komori et al. | |
| 5,552,213 A | 9/1996 | Eschner et al. | |
| 5,569,629 A | 10/1996 | Teneyck et al. | |
| 5,583,080 A | 12/1996 | Goldberg et al. | |
| 5,585,312 A | 12/1996 | Teneyck et al. | |
| 5,614,449 A | 3/1997 | Jensen | |
| RE35,557 E | 7/1997 | Thelohan et al. | |
| 5,691,255 A | 11/1997 | Jensen et al. | |
| 5,714,421 A | 2/1998 | Olds et al. | |
| 5,811,360 A | 9/1998 | Jubb | |
| 5,821,183 A | 10/1998 | Jubb | |
| 5,843,854 A | 12/1998 | Karppinen et al. | |
| 5,874,375 A | 2/1999 | Zoitos et al. | |
| 5,880,046 A | 3/1999 | Delvaux et al. | |
| 5,912,201 A | 6/1999 | Couture et al. | |
| 5,928,975 A | 7/1999 | Jubb | |
| 5,955,389 A | 9/1999 | Jubb | |
| 5,962,354 A | 10/1999 | Fyles et al. | |
| 5,994,247 A | 11/1999 | Jubb et al. | |
| 5,998,315 A | 12/1999 | Jubb | |
| 6,025,288 A | 2/2000 | Zoitos et al. | |
| 6,030,910 A | 2/2000 | Zoitos et al. | |
| 6,037,284 A * | 3/2000 | Holstein et al. | 501/35 |
| 6,043,172 A | 3/2000 | Hart | |
| 6,043,173 A | 3/2000 | Hart | |
| 6,060,414 A | 5/2000 | Holstein et al. | |
| 6,180,546 B1 | 1/2001 | Jubb et al. | |
| 6,214,102 B1 | 4/2001 | Vandermeer | |
| 6,287,994 B1 | 9/2001 | Hart | |
| 6,358,872 B1 | 3/2002 | Karppinen et al. | |
| 7,153,796 B2 * | 12/2006 | Jubb et al. | 501/36 |
| 2002/0032116 A1 | 3/2002 | Jubb et al. | |
| 2003/0162019 A1 | 8/2003 | Zoitos et al. | |
| 2004/0092379 A1 | 5/2004 | Lewis | |
| 2004/0254056 A1 * | 12/2004 | Jubb et al. | 501/35 |
| 2005/0037912 A1 * | 2/2005 | El Khiati et al. | 501/72 |

FOREIGN PATENT DOCUMENTS

| | | |
|---|---|---|
| CA | 588493 | 12/1959 |
| CA | 1 271 785 | 7/1990 |
| CA | 2017344 | 11/1990 |
| CA | 2043699 | 4/2001 |
| CA | 2017344 | 9/2002 |
| CN | 1 544 371 A | 11/2004 |
| CN | 1544371 A | 11/2004 |
| CN | 1207232 C | 6/2005 |
| DE | 1 94 2 991 | 3/1970 |
| DE | 27 48 127 | 5/1978 |
| DE | 2732 387 | 11/1978 |
| DE | 34 44 397 A1 | 6/1986 |
| DE | 39 05 394 C2 | 9/1989 |
| DE | 44 17 230 A1 | 11/1995 |
| DE | 44 17 231 A1 | 11/1995 |
| DE | 44 21 120 A1 | 12/1995 |
| DE | 44 47 576 A1 | 5/1996 |
| DE | 44 47 577 A1 | 5/1996 |
| EP | 0 019 600 A3 | 11/1980 |
| EP | 0 076 677 A1 | 4/1983 |
| EP | 0 091 866 A1 | 10/1983 |
| EP | 0 135 449 A1 | 3/1985 |
| EP | 0 144 349 B1 | 6/1985 |
| EP | 0 250 259 A1 | 12/1987 |
| EP | 0 390 223 A2 | 10/1990 |
| EP | 0 399 320 A1 | 11/1990 |
| EP | 0 399 652 A1 | 11/1990 |
| EP | 0 412 878 A1 | 2/1991 |
| EP | 0 459 897 A1 | 12/1991 |
| EP | 0 546 984 A1 | 6/1993 |
| EP | 0 585 547 A1 | 3/1994 |
| EP | 0 586 797 A1 | 3/1994 |
| EP | 0 588 251 A1 | 3/1994 |
| EP | 0 591 696 A1 | 4/1994 |
| EP | 0 685 434 B1 | 12/1995 |
| EP | 0 710 628 A2 | 5/1996 |
| EP | 0 917 045 A2 | 5/1999 |
| EP | 0 936 199 A2 | 8/1999 |
| EP | 0 115 673 B1 | 7/2001 |
| EP | 1 184 348 B1 | 3/2002 |
| EP | 1 288 172 A1 | 3/2003 |
| EP | 1 288 172 B1 | 3/2003 |
| EP | 1 323 687 A2 | 7/2003 |
| EP | 1 561 732 A1 | 8/2005 |
| FR | 1 165 275 | 10/1958 |
| FR | 1 589 410 | 3/1970 |
| FR | 2 118 026 | 7/1972 |
| FR | 1 662 688 A1 | 12/1991 |
| FR | 2 662 687 | 12/1991 |
| FR | 2 662 687 A1 | 12/1991 |
| FR | 2 662 688 | 12/1991 |
| FR | 2 781 788 A1 | 2/2000 |
| GB | 520247 | 4/1940 |
| GB | 790397 | 2/1958 |

| | | |
|---|---|---|
| GB | 810773 | 3/1959 |
| GB | 954836 | 4/1964 |
| GB | 1006524 | 10/1965 |
| GB | 1 045 848 | 10/1966 |
| GB | 1 204 472 | 9/1970 |
| GB | 1 209 244 | 10/1970 |
| GB | 1 273 205 | 5/1972 |
| GB | 1 391 384 | 4/1975 |
| GB | 1 399 556 | 7/1975 |
| GB | 1 446 910 | 8/1976 |
| GB | 1 462 173 | 1/1977 |
| GB | 1 473 908 | 5/1977 |
| GB | 1 532 612 | 11/1978 |
| GB | 2 011 379 B | 7/1979 |
| GB | 2 081 703 A | 2/1982 |
| GB | 2 083 017 A | 3/1982 |
| GB | 2 122 537 A | 1/1984 |
| GB | 2 150 553 A | 7/1985 |
| GB | 2 164 557 A | 3/1986 |
| GB | 2 259 700 A | 3/1993 |
| GB | 2 289 673 | 11/1995 |
| GB | 2 365 422 A | 12/2000 |
| GB | 2 383 793 | 7/2003 |
| JP | 49-27620 | 3/1974 |
| JP | 51-13819 | 2/1976 |
| JP | 51-43429 A | 4/1976 |
| JP | 51-133311 | 11/1976 |
| JP | 52-4519 | 1/1977 |
| JP | 52-139113 | 11/1977 |
| JP | 56-54252 | 5/1981 |
| JP | 6-305773 | 11/1994 |
| JP | P2001-180977 | 7/2001 |
| JP | 2003-3335 | 1/2003 |
| RU | 2 139 261 C1 | 10/1999 |
| SU | 276349 | 7/1970 |
| SU | 259337 | 8/1970 |
| SU | 607807 | 5/1978 |
| SU | 881025 | 11/1981 |
| SU | 1203045 A | 1/1986 |
| SU | 1 726 411 A1 | 4/1992 |
| WO | WO 84/04296 | 11/1984 |
| WO | WO 85/02393 | 6/1985 |
| WO | WO 85/02394 | 6/1985 |
| WO | WO 86/04807 | 8/1986 |
| WO | WO 87/05007 | 8/1987 |
| WO | WO 89/12032 | 12/1989 |
| WO | WO 90/02713 | 3/1990 |
| WO | WO 90/11756 | 10/1990 |
| WO | WO 91/11403 | 8/1991 |
| WO | WO 92/07801 | 5/1992 |
| WO | WO 92/09536 | 6/1992 |
| WO | WO 93/15028 | 8/1993 |
| WO | WO 93/19596 | 10/1993 |
| WO | WO 93/22251 | 11/1993 |
| WO | WO 94/14717 | 7/1994 |
| WO | WO 94/14718 | 7/1994 |
| WO | WO 94/15883 | 7/1994 |
| WO | WO 94/23801 | 10/1994 |
| WO | WO 95/21799 | 8/1995 |
| WO | WO 95/29135 | 11/1995 |
| WO | WO 95/31410 | 11/1995 |
| WO | WO 95/31411 | 11/1995 |
| WO | WO 95/32925 | 12/1995 |
| WO | WO 95/32926 | 12/1995 |
| WO | WO 95/32927 | 12/1995 |
| WO | WO 95/35265 | 12/1995 |
| WO | WO 96/01793 | 1/1996 |
| WO | WO 96/02478 | 2/1996 |
| WO | WO 96/04213 | 2/1996 |
| WO | WO 96/04214 | 2/1996 |
| WO | WO 96/14274 | 5/1996 |
| WO | WO 96/16913 | 6/1996 |
| WO | WO 96/30314 | 10/1996 |
| WO | WO 97/16386 | 5/1997 |
| WO | WO 97/20782 | 6/1997 |
| WO | WO 97/21636 | 6/1997 |
| WO | WO 97/29057 | 8/1997 |
| WO | WO 97/30002 | 8/1997 |
| WO | WO 97/49643 | 12/1997 |
| WO | WO 98/02394 | 1/1998 |
| WO | WO 01/19744 A1 | 3/2001 |
| WO | WO 03/059835 | 7/2003 |
| WO | WO 03/059835 A1 * | 7/2003 |
| WO | WO 03/060016 A1 | 7/2003 |

OTHER PUBLICATIONS

Thermal Ceramics Product Information Brochure entitled Superwool Blanket (Grade X-607), 2 pages (undated).
Brochure by Carborundum Company entitled Insulfrax$^R$ Specialty Glass Fiber Product Specification, 8 pages (Mar. 1993).
"Fiber Glass," J. Mohr and W. Rowe, Table of Contents and pp. 4-27 (Van Nostrand Reinhold Company) (undated).
"Prediction of Glass Durability as a Function of Glass Composition and Test Conditions:Thermodynamics and Kinetics," C.M. Jantzen, *Advances in the Fusion of Glass*, pp. 24.1-24.17 (undated).
"Stability of Radioactive Waste Glasses Assessed from Hydration Thermodynamics," M.J. Plodinec, C.M. Jantzen, and G.G. Wicks, pp. 755-758 (undated).
"Nuclear Waste Glass Durability: I, Predicting Environmental Response from Thermodynamic (Pourbaix) Diagrams," Carol M. Jantzen, *Journal of American Ceramic Society*, 75(9):2433-2448 (1992).
"Calcium Aluminate Glass Fibers: Drawing from Supercooled Melts Versus Inviscid Melt Spinning," F.T. Wallenberger et al., *Materials Letters,*, 11:229-235 (1991).
"Chemical Durability of Glass," *Chemistry of Glasses*, Chapter 6, 2nd Edition, A. Paul, pp. 179-218 (Chapman and Hall) (1990).
*Chemical Abstracts*, 110(10):373, Abstract No. 81274g (equivalent to CN-A-87 108257) (1989).
"Low-Cost Reinforcing Fibers Promise a High Level of Performance," S.A. Dunn, *Modern Plastics International*, pp. 50-51 (Jun. 1989).
"The Behaviour of Mineral Fibres in Physiological Solutions," H. Förster, *Proceedings of 1982 WHO IARC Conference*, Copenhagen, vol. 2, pp. 27-55 (1988).
"Chemical Durability," *Glass Science and Technology*, Chapter 34, pp. 377-388 (Elsevier) (1988).
"Glass-Water Interactions," H. Scholze, *Journal of Non-Crystalline Solids*, 102:1-10 (1988).
"The Reactions of MMMF in a Physiological Model Fluid and in Water," R. Klingholz & B. Steinkopf, *Proceedings of 1982 WHO IARC Conference*, Copenhagen, vol. 2, pp. 61-86 (1988).
"Solubility and Durability of Manmade Mineral Fibers in Physiological Fluids," J. Bauer, et al., (nineteen pages; dated no later than 1988).
Standard Test Methods for Fire Tests of Building Construction and Materials, ASTM Designation: E119-88, pp. 1-21 (1988).
"An In Vitro Study of the Chemical Durability of Siliceous Fibres," H. Scholze & R. Conradt, *Annals of Occupational Hygiene*, 31:48, pp. 683-692 (1987).
"In vitro Study on Siliceous Fibres,"H. Scholze & R. Conradt, *Proceedings of 1986 WHO IARC Conference*, 25 pages (1986).
"Chemical Durability of Asbestos and of Man-made Mineral Fibres in vivo," B. Bellman et al., *Aerosol Scientist*, vol. 17(3):341-345 1986.
"Prediction of Nuclear Waste Glass Durability from Natural Analogs," C.M. Jantzen, *Advances in Ceramics*, vol. 20, 10 pages, Nuclear Waste Management II (1986).
"Thermodynamic Model of Natural, Medieval and Nuclear Waste Glass Durability," C.M. Jantzen et al., *Journal of Non-Crystalline Solids*, 67:207-233 (1984).
"A New Approach to Predicting the Durability of Glasses from Their Chemical Compositions," R.G. Newton and A. Paul, *Glass Technology*, 21(6):307-309 (Dec. 1980).

"Inviscid Spinning of Filaments via Chemical Jet Stabilization," R.E. Cunningham, L.F. Rakestraw and S.A. Dunn, *The American Institute of Chemical Engineers Symposium Series*, No. 180, vol. 74:20-31 (1978).

"Chemical Durability of Glasses in the Systems $SiO_2$-CaO-$Na_2O$-$R_mO_n$,," H. Ohta and Y. Suzuki, *Ceramic Bulletin*, vol. 57(6):602-604 (1978).

"A Scale of Acidity and Basicity in Glass," The Glass Industry, Kuan-Han Sun, pp. 73-74 (Feb. 1948).

"Mineral Wool," by J. R. Thoenen, *Encyclopedia of Chemical Technology*, Kirk & Othmer, vol. 9:122-132 (The Interscience Encyclopedia, Inc., New York (copyright 1952).

"Mineral Wool," U.S. Bureau of Mines Information Circular I.C. 6984R, pp. 1-62 (Jun. 1939).

"Slag Wools," *Inorganic Fibres*, pp. 111-127 (undated).

"Preparation and Properties of Barium Ferrite Using Hot-Rolled Mill Scale," Chien, Yung-Tsen, et al., *J. Am. Ceram. Soc.*, vol. 72(8):1328-1332 (1989).

"The Dissolution of Asbestos Fibres in Water," Gronow, J., *Clay Minerals*, vol. 22:21-35 (1987).

"Man-Made Vitreous Fibers: An Overview of Studies on Their Biologic Effects," Gross, P., *Am. Ind. Hyg. Assoc. J.*, vol. 47(11):717-723 (Nov. 1986).

"Solubility of Asbestos and Man-Made Fibers In Vitro and In Vivo: Its Significance in Lung Disease," Morgan, A., et al., *Environmental Research*, vol. 39:475-484 (1986).

"Corrosion Phenomena in Glass Fibers and Glass Fiber Reinforced Thermosetting Resins," Bledzki, A. et al., *Composites Science & Technology*,,( Harris and Chou, eds., Elsevier Applied Science Publishers), vol. 23:263-285 (1985).

"Fiber Toxicology," Leineweber, J.P., *J. Occupational Medicine*, vol. 23(6):431-434 (Jun. 1981).

"Development of a Deoiling Process for Recycling Millscale," *Recycling in the Steel Industry, Proceedings of the 1st Process Technology Conference*, vol. 1:184-187, Washington, D.C., (Mar. 25-26, 1980).

"Effects of Glass Surface Area to Solution Volume Ration on Glass Corrosion," Ethridge, E.C. et al., *Physics and Chemistry of Glasses*, vol. 20 (2):35-40 (Apr. 1979).

"Glass Compositions for Glass Fibers," Moriya, Ichiro, et al., *Chemical Abstracts*, vol. 89, p. 285, Abstract 89:184615w (1978).

"Glass for Making Glass Fiber," Grigor'ev, V.S., et al., *Chemical Abstracts*, vol. 81, Abstract 140076b (1974).

"Dissolution Kinetics of Magnesium Silicates," Luce, R.W., et al., *Geochimica et Cosmochimica Acta*., vol. 36, pp. 35-50 (1972).

"Solubility of Fibres In Vitro and in Vivo," J.P. Leineweber, Proceedings of 1982 WHO IARC Conference, Copenhagen, vol. 2:87-101 (1988).

"*Elements of Ceramics*," Norton, F.H., (Addison-Wesley Publishing Co., Inc. Reading, Massachusetts. p. 39 (1952).

Carlock, D.E., "Ceramic Fibres," *Refractories Journal*, 58:17-20 (1983).

Dietrichs & Kronert, *Gas Warme International*, vol. 30, Issue No. 7/8 (Jul./Aug. 1981).

Ofentechnik Stahl & Eisen, "Furnace technology . . . Heat and Energy." 110(6)115 (Jun. 1990).

Keramishe Zeitschriften, 33(9):516 (1981).

Extract from ENV 1094, Part 7, section 7, 9-12 (1993).

Database WPIL Section Ch. Week 8218, 82-36551E (equivalent to JP-B-57016938 (undated).

"Multicomponent Silicate Glasses," *Molecular Structure*, pp. 28-31 (undated).

Thermal Ceramics Product Information for Superwool® Blanket, 2 pages, Mar. 1991.

Thermal Ceramics Brochure entitled "Innovative Solutions for Heat-Intensive Problems,", SF 607™ Blanket, SF 607™ Board, SF 607™ Paper (Apr. 1992), 7 pages.

Carborundum Product Information Brochure for Insulfrax® Blanket, 2 pages (Apr. 1993).

WPI Abstract Accession No. 93-285586 and JP5202352 (Aug. 10, 1993).

WPI Abstract Accession No. 87-154127 and JP62091545 (Apr. 27, 1987).

WPI Abstract Accession No. 81-26226D and JP56016578 (Feb. 17, 1981).

Insulcon Technical Datasheet entitled "Refractory Fiber Products" (seven pages, Nov. 1992).

Klinger, et al., "Recent developments in high-temperature heat-insulating materials of ceramic fibre," Conference Proceedings from $7^{th}$ Duisburger Warmedammtagen (Thermal Insulation Conference) Mar. 12, 13, 1997 (pp. 1-13) and its English translation.

Guyadec and Persson, "Inorganic Binders for High Temperatures Vacuum Forming of Ceramic Fibres," *Universite Joseph Fourier*, Grenoble, France, 1992 Eka Nobel AB (pp. 1-29).

Applications of Nalco® Colloidal Silicas, Nalco Chemical Company, May 1994, one page.

Brochure from Akzo-PQ Silica Amersfoort, Netherlands, 1993 (pp. 4 and 5) and its English translation.

Safety Data Sheet "Carbowool HT Products," by Carborundum Deutschland GmbH, May 28, 1998 (pp. 1-9) and its English translation.

Extract from two volume Brockhaus ABC Chemie, vol. 1 A-K, p. 672, 1971 relating to term Silica gel, Gelatinous silica and its English translation.

Cass, Richard B., *Fabrication of Continuous Ceramic Fiber by the Viscous Suspension Spinning Process*, Ceramic Bulletin, vol. 70, No. 3, 1981.

Waller, David, Poling of Lead Zirconate Titanate Ceramics and Flexible Piezoelectric Composites by the Corona Discharge Technique, *J. Am. Ceramic Society*, 72 [2] 322-24 (1989).

Selfridge, Alan R. *Approximate Material Properties in Isotropic Materials*, IEEE Transactions on Sonics and Ultrasonics, vol. SU-32 No. 3, May 1985 pp. 381-395.

Hayashi, Kunio et al., "Densification of Compacted Magnesium Alumino-Silicate Glass Powders," *Journal of the Ceramic Society of Japan, Int. Edition*, vol. 98-1077.

Shyu, Jiin-Jyh and Wu, Jenn-Ming, "Effect of $TiO_2$ addition on the nucleation of apatite in an MgO-Cao-$SiO_2$-$P_2O_5$ glass," *Journal of Materials Science Letters*, 1999, vol. 10, pp. 1056-1058.

Vogel, Werner and Höland, Wolfram, "Nucleation and crystallization kinetics of an MgO-$Al_2O_3$-$SiO_2$ base glass with various dopants," pp. 125-145.

Wallenberger, Frederick T. et al., "Inviscid Melt Spinning of Alumina Fibers: Chemical Jet Stabilization," *Journal of the American Ceramic Society*, 1992, vol. 75, No. 3.

Alexander, Iain C. and Jubb, Gary A., "Development of a soluble high-temperature insulation fibre," *Glastech. Ber. Glass Sci. Technol.*, 1997, vol. 70, No. 12.

Maier, V. and Müller, G., "Nucleation and crystallization in Mg-Al-silicate-glass-ceramics," *cfi/Ber.*, 1988, vol. 65, No. 6/7, pp. 208-212.

European Office Action.

European Search Report.

Office Action issued in corresponding Russian Application No. 2007120394 filed Oct. 26, 2005.

* cited by examiner

Viscosity Curves

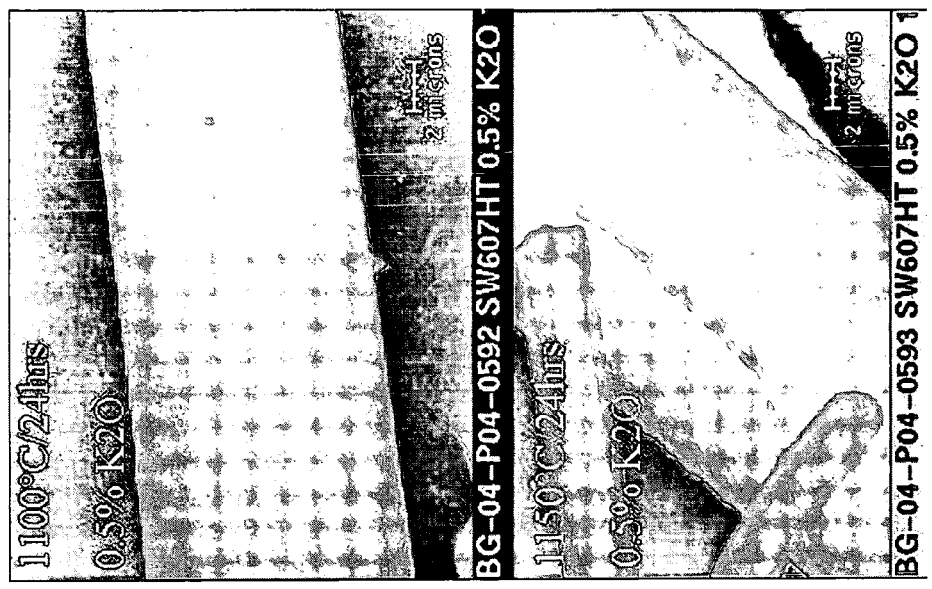
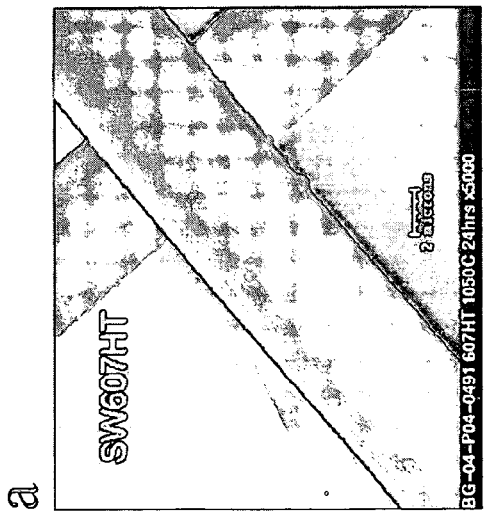
Fig. 8

MODIFICATION OF ALKALINE EARTH SILICATE FIBRES

REFERENCE TO RELATED APPLICATION

This application claims the benefit of priority from applicants' provisional application 60/717,516 filed Sep. 15, 2005 and British patent applications GB 0424190.7 filed Nov. 1, 2004 and GB 0502701.6 filed Feb. 9, 2005, all of which are relied on and incorporated herein by reference.

INTRODUCTION AND BACKGROUND

This invention relates to alkaline earth silicate fibres.

Inorganic fibrous materials are well known and widely used for many purposes (e.g. as thermal or acoustic insulation in bulk, mat, or blanket form, as vacuum formed shapes, as vacuum formed boards and papers, and as ropes, yarns or textiles; as a reinforcing fibre for building materials; as a constituent of brake blocks for vehicles). In most of these applications the properties for which inorganic fibrous materials are used require resistance to heat, and often resistance to aggressive chemical environments.

Inorganic fibrous materials can be either glassy or crystalline. Asbestos is an inorganic fibrous material one form of which has been strongly implicated in respiratory disease.

It is still not clear what the causative mechanism is that relates some asbestos with disease but some researchers believe that the mechanism is mechanical and size related. Asbestos of a critical size can pierce cells in the body and so, through long and repeated cell injury, have a bad effect on health. Whether this mechanism is true or not regulatory agencies have indicated a desire to categorise any inorganic fibre product that has a respiratory fraction as hazardous, regardless of whether there is any evidence to support such categorisation. Unfortunately for many of the applications for which inorganic fibres are used, there are no realistic substitutes.

Accordingly there is a demand for inorganic fibres that will pose as little risk as possible (if any) and for which there are objective grounds to believe them safe.

A line of study has proposed that if inorganic fibres were made that were sufficiently soluble in physiological fluids that their residence time in the human body was short; then damage would not occur or at least be minimised. As the risk of asbestos linked disease appears to depend very much on the length of exposure this idea appears reasonable. Asbestos is extremely insoluble.

As intercellular fluid is saline in nature the importance of fibre solubility in saline solution has long been recognised. If fibres are soluble in physiological saline solution then, provided the dissolved components are not toxic, the fibres should be safer than fibres which are not so soluble. Alkaline earth silicate fibres have been proposed for use as saline soluble, non-metallic, amorphous, inorganic oxide, refractory fibrous materials. The invention particularly relates to glassy alkaline earth silicate fibres having silica as their principal constituent.

International Patent Application No. WO8705007 disclosed that fibres comprising magnesia, silica, calcia and less than 10 wt % alumina are soluble in saline solution. The solubilities of the fibres disclosed were in terms of parts per million of silicon (extracted from the silica containing material of the fibre) present in a saline solution after 5 hours of exposure. WO8705007 stated that pure materials should be used and gave an upper limit of 2 wt % in aggregate to the impurities that could be present. No mention of alkali metals was made in this patent.

International Patent Application No. WO8912032 disclosed additional fibres soluble in saline solution and discusses some of the constituents that may be present in such fibres. This disclosed the addition of $Na_2O$ in amounts ranging from 0.28 to 6.84 wt % but gave no indication that the presence of $Na_2O$ had any effect.

European Patent Application No. 0399320 disclosed glass fibres having a high physiological solubility and having 10-20 mol % $Na_2O$ and 0-5 mol % $K_2O$. Although these fibres were shown to be physiologically soluble their maximum use temperature was not indicated.

Further patent specifications disclosing selection of fibres for their saline solubility include for example European 0412878 and 0459897, French 2662687 and 2662688, PCT WO8604807, WO9002713, WO9209536, WO9322251, WO9415883, WO9716386 and U.S. Pat. No. 5,250,488.

The refractoriness of the fibres disclosed in these various prior art documents varies considerably and for these alkaline earth silicate materials the properties are critically dependent upon composition.

As a generality, it is relatively easy to produce alkaline earth silicate fibres that perform well at low temperatures, since for low temperature use one can provide additives such as boron oxide to ensure good fiberisation and vary the amounts of the components to suit desired material properties. However, as one seeks to raise the refractoriness of alkaline earth silicate fibres, one is forced to reduce the use of additives since in general (albeit with exceptions) the more components are present, the lower the refractoriness.

WO9315028 disclosed fibres comprising CaO, MgO, $SiO_2$, and optionally $ZrO_2$ as principal constituents. Such fibres are frequently known as CMS (calcium magnesium silicate) or CMZS ((calcium magnesium zirconium silicate) fibres. WO9315028 required that the compositions used should be essentially free of alkali metal oxides. Amounts of up to 0.65 wt % were shown to be acceptable for materials suitable for use as insulation at 1000° C. WO9315028 also required low levels of $Al_2O_3$ (<3.97%).

WO9415883 disclosed a number of such fibres usable as refractory insulation at temperatures of up to 1260° C. or more. As with WO9315028, this patent required that the alkali metal oxide content should be kept low, but indicated that some alkaline earth silicate fibres could tolerate higher levels of alkali metal oxide than others. However, levels of 0.3% and 0.4% by weight $Na_2O$ were suspected of causing increased shrinkage in materials for use as insulation at 1260° C. The importance of keeping the level of alumina low was stressed is stressed in this document.

WO9716386 disclosed fibres usable as refractory insulation at temperatures of up to 1260° C. or more. These fibres comprised MgO, $SiO_2$, and optionally $ZrO_2$ as principal constituents. These fibres are stated to require substantially no alkali metal oxides other than as trace impurites (present at levels of hundredths of a percent at most calculated as alkali metal oxide). The fibres have a general composition

| | |
|---|---|
| $SiO_2$ | 65–86% |
| MgO | 14–35% | with the components MgO and $SiO_2$ comprising at least 82.5% by weight of the fibre, the balance being named constituents and viscosity modifiers. Such magnesium silicate fibres may comprise low quantities of other alkaline earths. The importance of keeping the level of alumina low was stressed is stressed in this document.

WO2003059835 discloses certain calcium silicate fibres certain calcium silicate compositions for which fibres show a low reactivity with aluminosilicate bricks, namely:—

65%<$SiO_2$<86%
 MgO<10%
 14%<CaO<28%
 $Al_2O_3$<2%
 $ZrO_2$<3%
 $B_2O_3$<5%
 $P_2O_5$<5%
 72%<$SiO_2+ZrO_2+B_2O_3+5*P_2O_5$
 95%<$SiO_2+CaO+MgO+Al_2O_3+ZrO_2+B_2O_3+P_2O_5$

This patent also discloses the use of $La_2O_3$ or other lanthanide additives to improve the strength of the fibres and blanket made from the fibres. This patent application does not mention alkali metal oxide levels, but amounts in the region of ~0.5 wt % were disclosed in fibres intended for use as insulation at up to 126° C. or more.

WO2003060016 claims a low shrinkage, high temperature resistant inorganic fiber having a use temperature up to at least 1330 C, which maintains mechanical integrity after exposure to the use temperature and which is non-durable in physiological fluids, comprising the fiberization product of greater than 71.25 to about 85 weight percent silica, 0 to about 20 weight percent magnesia, about 5 to about 28.75 weight percent calcia, and 0 to about 5 weight percent zirconia, and optionally a viscosity modifier in an amount effective to render the product fiberizable.

EP 1323687 claims a biosoluble ceramic fiber composition for a high temperature insulation material comprising 75-80 wt % of $SiO_2$, 13-25 wt % of CaO, 1-8 wt % of MgO, 0.5-3 wt % of $ZrO_2$ and 0-0.5 wt % of $Al_2O_3$, wherein ($ZrO_2+Al_2O_3$) is contained 0.5-3 wt % and (CaO+MgO) is contained 15-26 wt %.

Alkaline earth silicate fibres have received a definition in the Chemical Abstract Service Registry [Registry Number: 436083-99-7] of:—

"Chemical substances manufactured in the form of fibers. This category encompasses substances produced by blowing or spinning a molten mixture of alkaline earth oxides, silica and other minortrace oxides. It melts around 1500° C. (2732° F.). It consists predominantly of silica (50-82 wt %), calcia and magnesia (18-43 wt %), alumina, titania and zirconia (<6 wt %), and trace oxides.".

This definition reflects European Health and Safety regulations which impose special labelling requirements on silicate fibres containing less than 18% alkaline earth oxides.

However as is clearly indicated in relation to WO2003059835, WO2003060016 and EP 1323687, the silica content of alkaline earth silicate fibres is increasing with the demand for higher use temperatures and this is leading to lower alkaline earth contents.

The present invention is applicable not only to alkaline earth silicate fibres in this narrow definition reflected in the Chemical Abstracts definition, but also to alkaline earth silicate fibres having lower levels of alkaline earth oxides.

Accordingly, in the present specification alkaline earth silicate fibres should be considered to be materials comprising predominantly of silica and alkaline earth oxides and comprising less than 10 wt % alumina [as indicated in WO8705007—which first introduced such fibres], preferably in which alumina, zirconia and titania amount to less that 6 wt % [as indicated in the Chemical Abstracts definition]. For regulatory reasons, preferred materials contain more than 18% alkaline earth metal oxides.

The prior art shows that for refractory alkaline earth silicate fibres, alkali metals have been considered as impurities that can be tolerated at low levels but which have detrimental affects on refractoriness at higher levels.

SUMMARY OF THE INVENTION

The applicant has found that, contrary to received wisdom in the field of refractory alkaline earth silicate fibres, the addition of minor quantities of alkali metals within a certain narrow range improves the mechanical quality of fibres produced (in particular fibre strength) without appreciably damaging the refractoriness of the fibres.

Accordingly, the present invention provides a method of making refractory alkaline earth silicate fibres from a melt, comprising the inclusion as an intended melt component of alkali metal to improve the mechanical andor thermal properties of the fibre in comparison with a fibre free of alkali metal.

Preferably, the amount of alkali metal (M) expressed as the oxide $M_2O$ is greater than 0.2 mol % and preferably in the range 0.2 mol % to 2.5 mol %, more preferably 0.25 mol % to 2 mol %.

By "a fibre free of alkali metal" is meant a fibre in which all other components are present in the same proportions but which lacks alkali metal.

The alkali metal is preferably present in an amount sufficient to increase the tensile strength of a blanket made using the fibre by >50% over the tensile strength of a blanket free of alkali metal, and less than an amount that will result in a shrinkage as measured by the method described below of greater than 3.5% in a vacuum cast preform of the fibre when exposed to 1250° C. for 24 hours.

It will be apparent that the alkali metal may be provided either as an additive to the melt (preferably in the form of an oxide), or by using as ingredients of the melt appropriate amounts of materials containing alkali metal as a component or impurity, or both as an additive and as a component or impurity. The invention lies in ensuring that the melt has the desired quantity of alkali metal to achieve the beneficial effects of the invention.

The invention may be applied to all of the prior art alkaline earth silicate compositions mentioned above.

BRIEF DESCRIPTION OF DRAWINGS

The scope and further features of the invention will become apparent from the claims in the light of the following illustrative description and with reference to the drawings in which:—

DETAILED DESCRIPTION OF INVENTION

The inventors produced fibre blanket using a production trial line at their factory in Bromborough, England. Fibre was produced by forming a melt and allowing the melt to fall onto a pair of spinners (as is conventionally known).

The base melt had a nominal composition in weight percent:—

| | |
|---|---|
| $SiO_2$ | 73.5 |
| CaO | 25 |
| $La_2O_3$ | 1.5 | with other components forming minor impurities and sodium oxide being added in specified amounts.

The melt stream temperature was monitored using a two colour pyrometer.

Fibres produced from the spinners were passed onto a conveyer and then needled to form blanket in a conventional manner.

The blanket thickness, density, and tensile strength were measured for fibres produced using a range of conditions.

The blanket was produced with a view to determining the effect on fibre quality of melt stream temperature, since it was believed that this had an effect on fibre quality.

The inventors also decided to add alkali metal oxides with the view of flattening the viscosity-temperature curve of the melt as this was thought a relevant factor in fibre production as explained further below.

Figure 1:
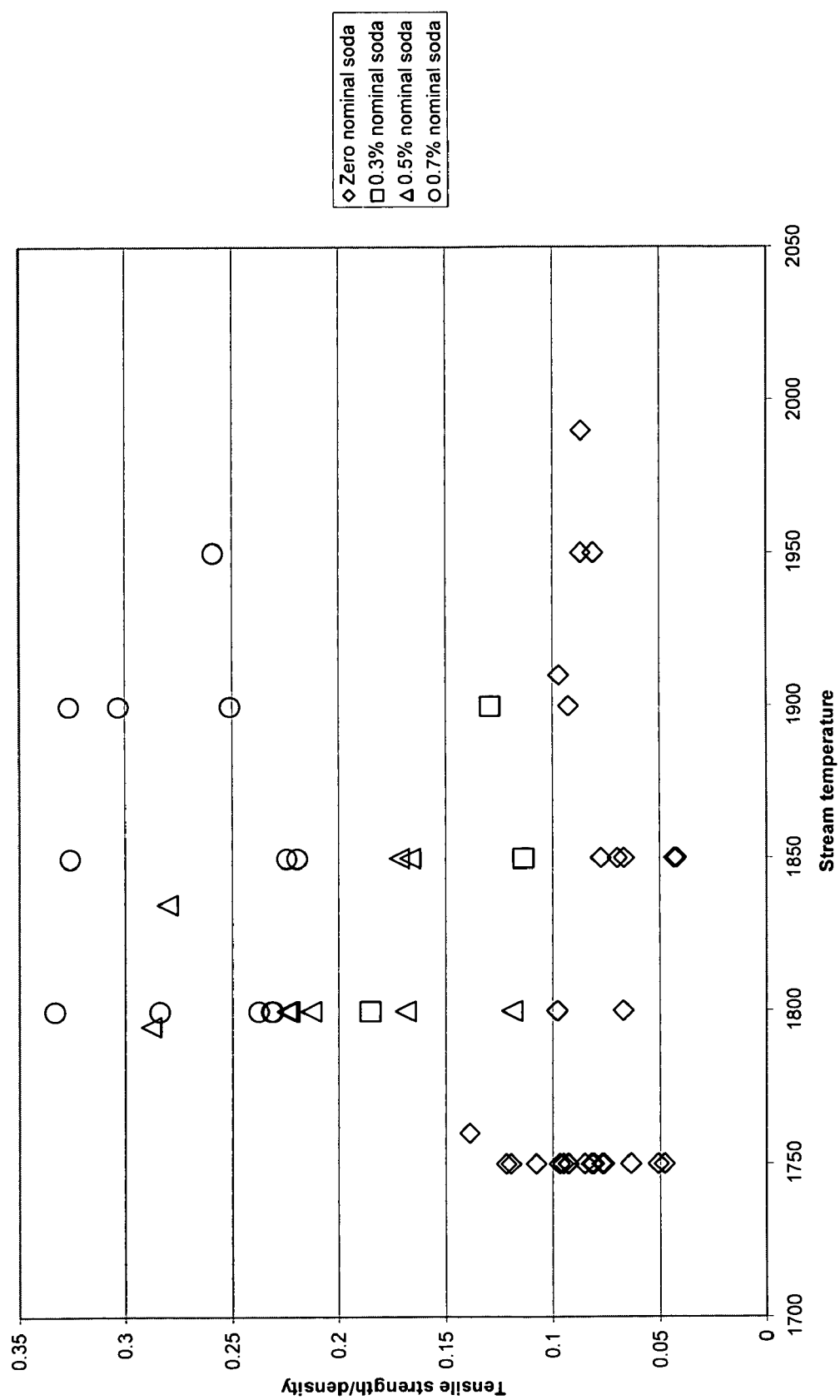
FIG. 1 is a graph showing tensile strengthdensity plotted against melt stream temperatures as determined in a production trial for a number of fibres of differing $Na_2O$ content.
Figure 2:
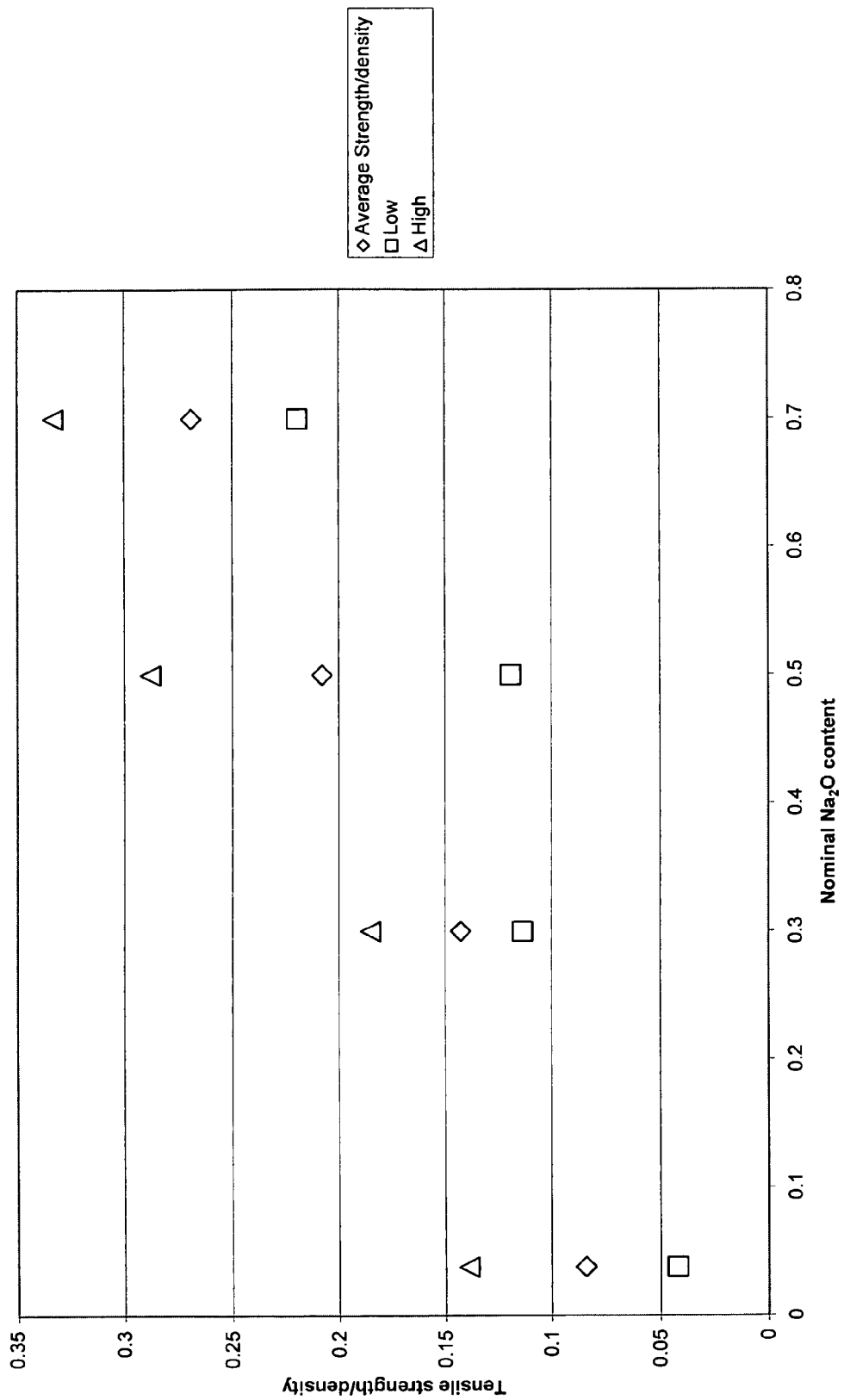
FIG. 2 is a graph plotting maximum, average, and minimum values of tensile strengthdensity against $Na_2O$ content for the same fibres.

The results of these tests are set out in Table 1 and illustrated graphically in FIGS. 1 and 2. In Table 1, the melt stream temperature, blanket thickness, blanket density, tensile strength and tensile strength divided by density is shown for all compositions. [The tensile strength divided by density is calculated to counteract the variation attributable to different amounts of material being in the blanket]. Also for selected compositions the shrinkage of a preform at 1150° C. and 1250° C. was measured in the same manner as in WO2003059835.

The first thing that is noteworthy is that the blanket strengths show a high variability. This is because the manufacture of a blanket involves many variables, including:—

Composition of the melt
Temperature of the melt
Melt stream temperature
Shot content (melt that has solidified in the form of droplets rather than fibres)
Fibre diameter
Fibre length
Needling conditions
Post-solidification thermal history By producing a range of fibres on a single line and significantly varying only melt stream temperature and composition (each of which will have an affect on shot content, fibre diameter and fibre length) it was hoped to reduce such variability. However because a blanket is an aggregated body of individual fibres, there is inevitably a statistical variation in such aggregate properties as tensile strength.

As can be seen from FIG. 1 there appears to be relatively little variation in strength with melt stream temperature, but since the range of melt stream temperatures chosen was selected to encompass ranges previously found to be effective, this is not surprising.

However, it can be seen that with progressive increases in $Na_2O$ content, the strength tends to increase. FIG. 2 shows the maximum, minimum, and average strengths found for a range of compositions and it can be seen that blanket strength shows a strong positive correlation with $Na_2O$ content. In contrast, the shrinkage of the fibres seemed barely affected.

The fibres with nominal zero $Na_2O$ content of course had minor trace amounts (average measured content 0.038%-maximum 0.11%). Extrapolating back to zero $Na_2O$ gives an average tensile strengthdensity of 0.0675 kPa[kgm³]. The average tensile strengthdensity for the addition of 0.3% $Na_2O$ is 0.1426. The increase in blanket strength is over 100% and smaller additions (e.g. 0.25 mol %) would be expected to exceed a 50% improvement.

TABLE 1

| Melt Stream Temperature ° C. | Blanket thickness (mm) | Blanket density (kg/m³) | % linear shrinkage 1150° C./24 hours | % linear shrinkage 1250° C./24 hours | Tensile Strength kPa (average of three mesurements) | Tensile strength/ density |
|---|---|---|---|---|---|---|
| Zero nominal $Na_2O$ content | | | | | | |
| 1750 | 7.20 | 118 | | | 5.67 | 0.048023 |
| 1750 | 8.18 | 109 | | | 8.33 | 0.076453 |
| 1750 | 16.87 | 161 | | | 15.33 | 0.095238 |
| 1750 | 15.12 | 169 | | | 15.67 | 0.092702 |
| 1750 | 15.71 | 134 | | | 16.00 | 0.119403 |
| 1750 | 20.51 | 141 | | | 13.67 | 0.096927 |
| 1750 | 19.14 | 138 | | | 11.33 | 0.082126 |
| 1750 | 18.58 | 125 | | | 9.67 | 0.077333 |
| 1750 | 18.87 | 141 | | | 12.00 | 0.085106 |
| 1750 | 25.92 | 130 | | | 14.00 | 0.107692 |
| 1750 | 24.49 | 140 | | | 17.00 | 0.121429 |
| 1750 | 15.88 | 166 | | | 13.47 | 0.081124 |
| 1750 | 17.34 | 144 | | | 7.33 | 0.050926 |
| 1750 | 11.00 | 174 | | | 16.20 | 0.093103 |
| 1750 | 22.01 | 124 | 0.52 | 0.88 | 7.91 | 0.06379 |
| 1760 | 16.60 | 133 | | | 18.47 | 0.138847 |
| 1800 | 8.06 | 129 | | | 8.67 | 0.067183 |
| 1800 | 22.04 | 132 | | | 12.92 | 0.097904 |
| 1800 | 21.97 | 139 | | | 13.62 | 0.09801 |
| 1850 | 7.75 | 120 | | | 9.33 | 0.077778 |

TABLE 1-continued

| Melt Stream Temperature ° C. | Blanket thickness (mm) | Blanket density (kg/m³) | % linear shrinkage 1150° C./24 hours | % linear shrinkage 1250° C./24 hours | Tensile Strength kPa (average of three mesurements) | Tensile strength/ density |
|---|---|---|---|---|---|---|
| 1850 | 18.49 | 133 | | | 9.31 | 0.069962 |
| 1850 | 18.12 | 128 | | | 8.56 | 0.066901 |
| 1850 | 17.19 | 123 | | | 5.33 | 0.043333 |
| 1850 | 24.49 | 125 | | | 5.26 | 0.042107 |
| 1900 | 21.83 | 114 | | | 10.57 | 0.092708 |
| 1910 | 8.50 | 127 | | | 12.33 | 0.097113 |
| 1950 | 8.14 | 115 | | | 9.33 | 0.081159 |
| 1950 | 8.92 | 115 | | | 10.00 | 0.086957 |
| 1990 | 19.39 | 123 | | | 10.67 | 0.086764 |
| 0.3 wt % nominal Na₂O content | | | | | | |
| 1800 | 22.82 | 107 | | | 19.83 | 0.185327 |
| 1850 | 17.10 | 149 | | | 16.91 | 0.113512 |
| 1900 | 24.40 | 137 | | | 17.66 | 0.128881 |
| 0.5 wt % nominal Na₂O content | | | | | | |
| 1795 | 20.32 | 169 | 0.43 | 1.70 | 48.64 | 0.287811 |
| 1800 | 19.98 | 147 | | | 24.81 | 0.168913 |
| 1800 | 25.25 | 136 | | | 16.17 | 0.118922 |
| 1800 | 18.64 | 153 | | | 34.24 | 0.223769 |
| 1800 | 18.02 | 190 | | | 42.65 | 0.224456 |
| 1800 | 24.22 | 175 | | | 37.26 | 0.212895 |
| 1800 | 22.47 | 165 | | | 36.83 | 0.223212 |
| 1835 | 14.54 | 150 | | | 42.01 | 0.280067 |
| 1850 | 23.50 | 164 | 0.31 | 1.04 | 27.29 | 0.166789 |
| 1850 | 25.15 | 162 | | | 27.85 | 0.171681 |
| 0.7 wt % nominal Na₂O content | | | | | | |
| 1800 | 21.91 | 166 | | | 47.12 | 0.283835 |
| 1800 | 21.25 | 166 | | | 38.32 | 0.230863 |
| 1800 | 18.44 | 161 | | | 53.64 | 0.333188 |
| 1800 | 19.22 | 163 | | | 38.74 | 0.237669 |
| 1800 | 19.95 | 144 | 0.48 | 1.11 | 33.35 | 0.231597 |
| 1850 | 26.04 | 175 | 0.48 | 0.90 | 38.41 | 0.219467 |
| 1850 | 23.48 | 166 | | | 54.11 | 0.325984 |
| 1850 | 27.73 | 165 | | | 37.03 | 0.224404 |
| 1900 | 29.30 | 166 | | | 41.69 | 0.251165 |
| 1900 | 21.16 | 135 | | | 44.09 | 0.326617 |
| 1900 | 19.49 | 135 | | | 40.93 | 0.30316 |
| 1950 | 25.88 | 151 | | | 39.12 | 0.259073 |

Encouraged by this, and with a view to determining the upper limit of alkali metal oxide that was appropriate, the inventors produced a range of further alkaline earth silicate fibres using an experimental rig in which a melt was formed of appropriate composition, tapped through a 8-16 mm orifice, and blown to produce fibre in a known manner. (The size of the tap hole was varied to cater for the viscosity of the melt—this is an adjustment that must be determined experimentally according to the apparatus and composition used). Shrinkage of performs of the fibre at 1150° C. and 1250° C. were measured in the same manner as in WO2003059835. Total solubility in ppm of the major glass components after a 24 hour static test in a physiological saline solution were also measured for some of the examples.

The results of these studies are shown in Table 2. The fibres in the left of the table were aimed at assessing the effect of adding approximately equimolar amounts of alkali metal addition to calcium silicate fibre containing $La_2O_3$ (as in WO2003059835), whereas those to the right were aimed at assessing the effect of varying the quantity of $Na_2O$ in such a fibre. While not conclusive, the results indicate that for these fibres $Na_2O$ and $K_2O$ show shrinkages no worse or even better than fibre free of $Na_2O$, whereas $Li_2O$ appears detrimental to shrinkage.

However, this latter conclusion is thought unsafe since it was determined that the lithium had been added in the form of lithium tetraborate, and the boron addition may have had a significant effect. Until proven otherwise, the applicants are assuming that all alkali metals can be used in the invention, but that the absolute amount of alkali metal may vary from metal to metal and fibre to fibre. The solubility figures show that total solubility is slightly increased by the addition of alkali metal oxide.

TABLE 2

| Sample | PAT STD 01 | PAT Na₂O 02 | PAT Li₂O 03 | PAT K₂O 04 | BG-X-04-0305 | BG-X-04-0277 | BG-X-04-0279 |
|---|---|---|---|---|---|---|---|
| Component | | | | | | | |
| Na₂O | 0.26 | 0.95 | 0.12 | 0.24 | 0.6 | 0.72 | 1.14 |
| MgO | 0.38 | 0.39 | 0.36 | 0.36 | 0.35 | 0.38 | 0.36 |

TABLE 2-continued

| Sample | PAT STD 01 | PAT Na₂O 02 | PAT Li₂O 03 | PAT K₂O 04 | BG-X-04-0305 | BG-X-04-0277 | BG-X-04-0279 |
|---|---|---|---|---|---|---|---|
| Al$_2$O$_3$ | 0.6 | 0.64 | 0.56 | 0.62 | 0.38 | 0.02 | 0 |
| SiO$_2$ | 72.58 | 72.47 | 72.43 | 72.40 | 73.26 | 73.58 | 73.76 |
| K$_2$O | 0.08 | 0.08 | 0.07 | 1.05 | 0.07 | 0.08 | 0.08 |
| CaO | 24.05 | 23.27 | 23.62 | 22.67 | 22.82 | 23.52 | 23.22 |
| TiO$_2$ | 0.1 | 0.10 | 0.11 | 0.15 | 0.1 | 0.1 | 0.1 |
| Fe$_2$O$_3$ | 0.16 | 0.19 | 0.21 | 0.23 | 0.16 | 0.18 | 0.18 |
| La$_2$O$_3$ (estimated) | 1.3 | 1.3 | 1.3 | 1.3 | 1.3 | 1.3 | 1.3 |
| Li$_2$O | | | 0.34* | | | | |
| % Linear Shrinkage | | | | | | | |
| 850° C./24 hours | | | | | 0.38 | 0.21 | 0.22 |
| 1150° C./24 hours | 1.05 | 0.88 | 1.58 | 0.63 | 0.47 | 0.36 | 0.59 |
| 1250° C./24 hours | 1.08 | 1.08 | 1.71 | 0.79 | 0.48 | 0.69 | 0.84 |
| % Thickness shrinkage | | | | | | | |
| 850° C./24 hours | | | | | 0.42 | 0.71 | 1.31 |
| 1150° C./24 hours | | | | | 0.93 | 0.71 | 1.44 |
| 1250° C./24 hours | | | | | 0.91 | 0.72 | 6.43 |
| Static Solubility 24 hrs (ppm) | | | | | | | |
| | 191 | 202 | 200 | N/A | | | |

The right side of Table 2 shows firstly that only a ~1% higher silica content has a big effect on shrinkage, giving a much lower shrinkage. For these fibres, linear shrinkage at 850° C.24 hrs seemed unaffected by all soda additions tested, however the same is not true for thickness shrinkage, although it is still low. At 1150° C.24 hrs there is a slight increase in both linear and through thickness shrinkage, but at 1250° C.24 hrs through thickness whilst still acceptable grows more significantly for the highest soda addition. All of these figures are acceptable for some applications whereas other applications could not tolerate the highest Na$_2$O level tested.

The improvement in shrinkage with higher silica levels led the inventors to look to materials containing still higher silica levels and the results are set out in Table 3 below.

Figure 6:
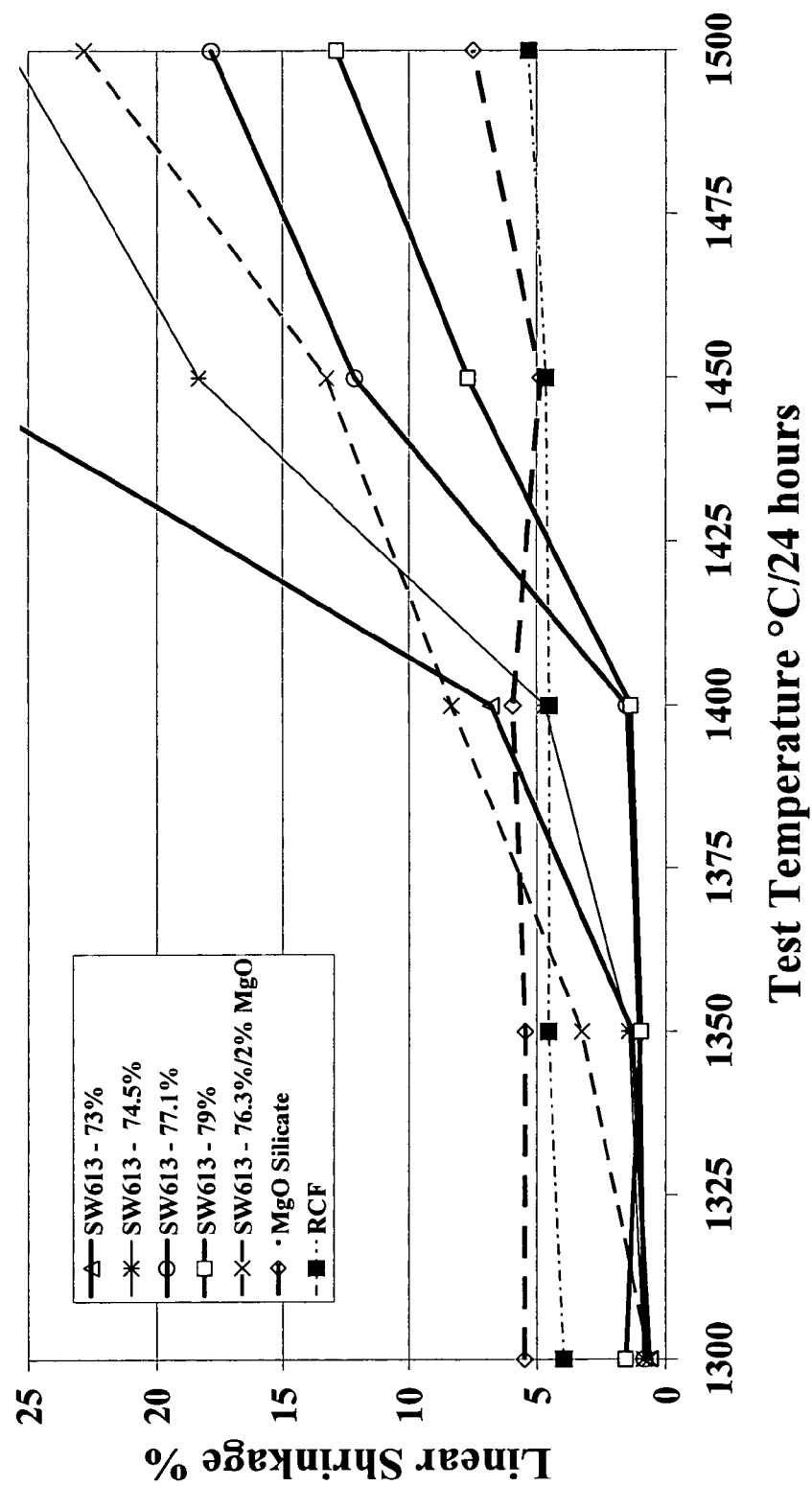
FIG. 6 is a graph of linear shrinkages for alkaline earth silicate fibres of varying composition, compared with known refractory ceramic fibre (RCF) fibres

FIG. 6 shows the shrinkage at various temperatures of preforms of a range of alkaline earth silicate fibres. The reference SW613 refers to lanthanum containing materials of composition similar to those set out in Table 3 with varying silica contents as indicated but absent any alkali metal addition. [Silica and calcia comprising most of the material with lanthanum oxide being present in about 1.3%]. One of these fibres also has an addition of 2 wt % MgO. Also shown are shrinkages for a conventional aluminosilicate fibre (RCF) and a magnesium silicate fibre (MgO Silicate).

It can be seen that all of the SW613 fibres have a shrinkage lower than that of RCF and the MgO silicate fibres up to 1350° C. but rise thereafter. However, there is a progressive increase in refractoriness with increasing silica content. For the SW613 fibre containing 77 and 79% SiO$_2$, the shrinkage

TABLE 3

| Sample | PAT Na₂O 05 | PAT Na₂O 06 | PAT Na₂O 07 | PAT Na₂O 08 | PAT Na₂O 09 | PAT Na₂O 10 |
|---|---|---|---|---|---|---|
| Component | | | | | | |
| Na$_2$O | 0.5 | 0.5 | 0.5 | 0.5 | 0.5 | 1.1 |
| MgO | 0.4 | 0.3 | 0.3 | 0.4 | 0.3 | 0.4 |
| Al$_2$O$_3$ | 0.6 | 0.5 | 0.6 | 0.8 | 0.6 | 0.8 |
| SiO$_2$ | 73.9 | 74.3 | 74.5 | 75.2 | 76.3 | 77.7 |
| K$_2$O | 0.1 | 0.1 | 0.1 | 0.1 | 0.1 | 0.1 |
| CaO | 23.6 | 22.9 | 22.6 | 22.0 | 21.4 | 19.3 |
| TiO$_2$ | 0.1 | 0.1 | 0.1 | 0.1 | 0.1 | 0.1 |
| Fe$_2$O$_3$ | 0.2 | 0.2 | 0.2 | 0.2 | 0.2 | 0.2 |
| La$_2$O$_3$ | 1.3 | 1.3 | 1.3 | 1.3 | 1.3 | 1.3 |
| % Linear Shrinkage | | | | | | |
| 1150° C./24 hrs | 0.54 | 0.8 | 0.61 | 0.56 | 0.65 | 0.58 |
| 1250° C./24 hrs | 1.1 | 1.07 | N/A | 0.84 | 0.86 | N/A |
| Static Solubility 24 hrs (ppm) | | | | | | |
| | 199 | 208 | 165 | 194 | 245 | 107 |

These results show low shrinkage and a reasonably high solubility across the range. It appears that addition of alkali metal oxide may increase the amount of silica that can be added to produce a workable alkaline earth silicate fibre, and perhaps with an acceptable solubility. This is of great significance since, in general, increasing silica content permits higher use temperatures for alkaline earth silicate fibres.

remains below that of RCF and the MgO silicate fibres up to 1400° C. and better could be expected for higher silica contents. In contrast, it can be seen also that addition of 2% MgO to the SW613 compositions is detrimental to shrinkage. High silica alkaline earth silicate fibres are difficult to make and addition of alkali metals to such compositions should improve the quality of such fibres and ease manufacture.

Having shown such effects the applicants conducted a trial to make blanket on a production line, to see whether the initial results on shrinkage were confirmed. A base composition comprising:—

Figure 7:
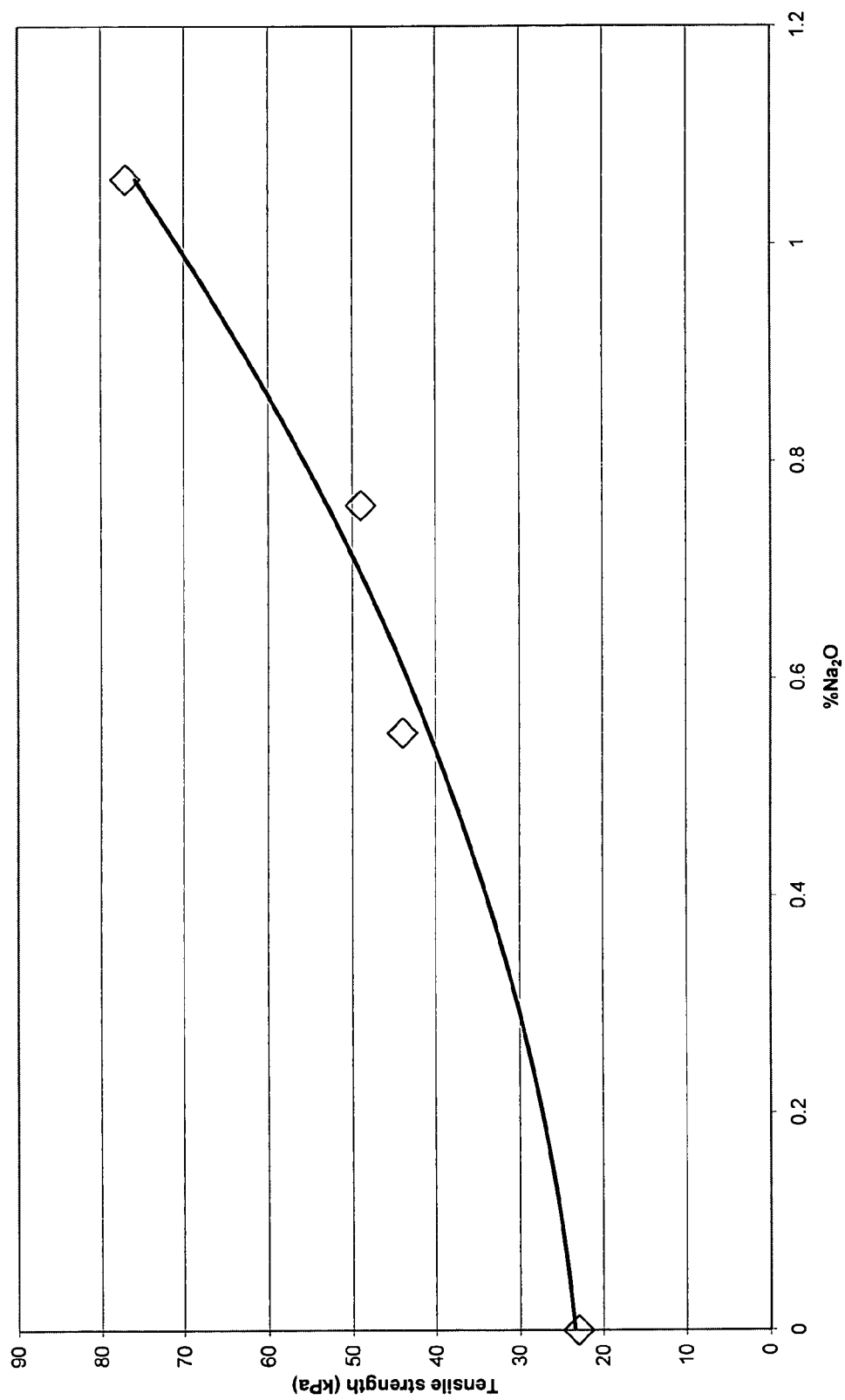
FIG. 7 is a graph of the effect on blanket strength of sodium addition to a range of alkaline earth silicate fibres FIG. 8 contrasts micrographs showing various fibres after exposure to a range of temperatures

| | |
|---|---|
| SiO$_2$ | 72.5–74 wt % |
| CaO | 24–26.5 wt % |
| MgO | 0.4–0.8 wt % |
| Al$_2$O$_2$ | <0.3 wt % |
| La$_2$O$_3$ | 1.2–1.5 wt % | was used and varying amounts of Na$_2$O were added. Blanket having a density 128 kgm$^3$ was produced having a thickness of ~25 mm. The results, summarised in FIG. 7, show a dramatic increase in blanket strength with Na$_2$O addition.

These findings relate to compositions containing La$_2$O$_3$ as a component, but similar effects of alkali metal additions are found with alkaline earth silicate fibres not containing La$_2$O$_3$ as a component.

The inventors also tested other alkaline earth silicate fibres comprising predominantly magnesium as the alkaline earth component (magnesium silicate fibres) and the results are set out in Table 4.

This table shows that whereas Na$_2$O and K$_2$O have a small or large respectively detrimental effect on shrinkage, Li$_2$O has hardly any effect on shrinkage. This does not imply no effect at all, the inventors observed that whereas the fibres with Na$_2$O and K$_2$O were similar to fibres without such additives (coarse) the fibre with Li$_2$O addition was significantly finer and of better quality. At lower quantities, Na$_2$O and K$_2$O may still give shrinkages that are tolerable in most applications.

TABLE 4

| | Sample | | | |
|---|---|---|---|---|
| | 04 MgO 01 | 04 MgO 02 | 04 MgO 03 | 04 MgO 04 |
| Component | | | | |
| Na$_2$O | 0.0 | 0.5 | 0.0 | 0.0 |
| MgO | 20.0 | 19.1 | 19.6 | 18.3 |
| Al$_2$O$_3$ | 1.7 | 2.0 | 1.8 | 1.7 |
| SiO$_2$ | 77.6 | 77.5 | 77.8 | 78.2 |
| K$_2$O | 0.0 | 0.0 | 0.0 | 1.0 |
| CaO | 0.5 | 0.5 | 0.6 | 0.5 |
| TiO$_2$ | 0.1 | 0.1 | 0.1 | 0.1 |
| Fe$_2$O$_3$ | 0.5 | 0.5 | 0.5 | 0.5 |
| Li$_2$O | | | | 0.3 |
| % Linear Shrinkage | | | | |
| 1150° C./ 24 hrs | 2.53 | 3.53 | 2.34 | 5.59 |
| 1250° C./ 24 hrs | 2.16 | 3.57 | 2.3 | 9.94 |
| Static Solubility 24 hrs (ppm) | | | | |
| | 297 | N/A | 331 | N/A |

Figure 3:
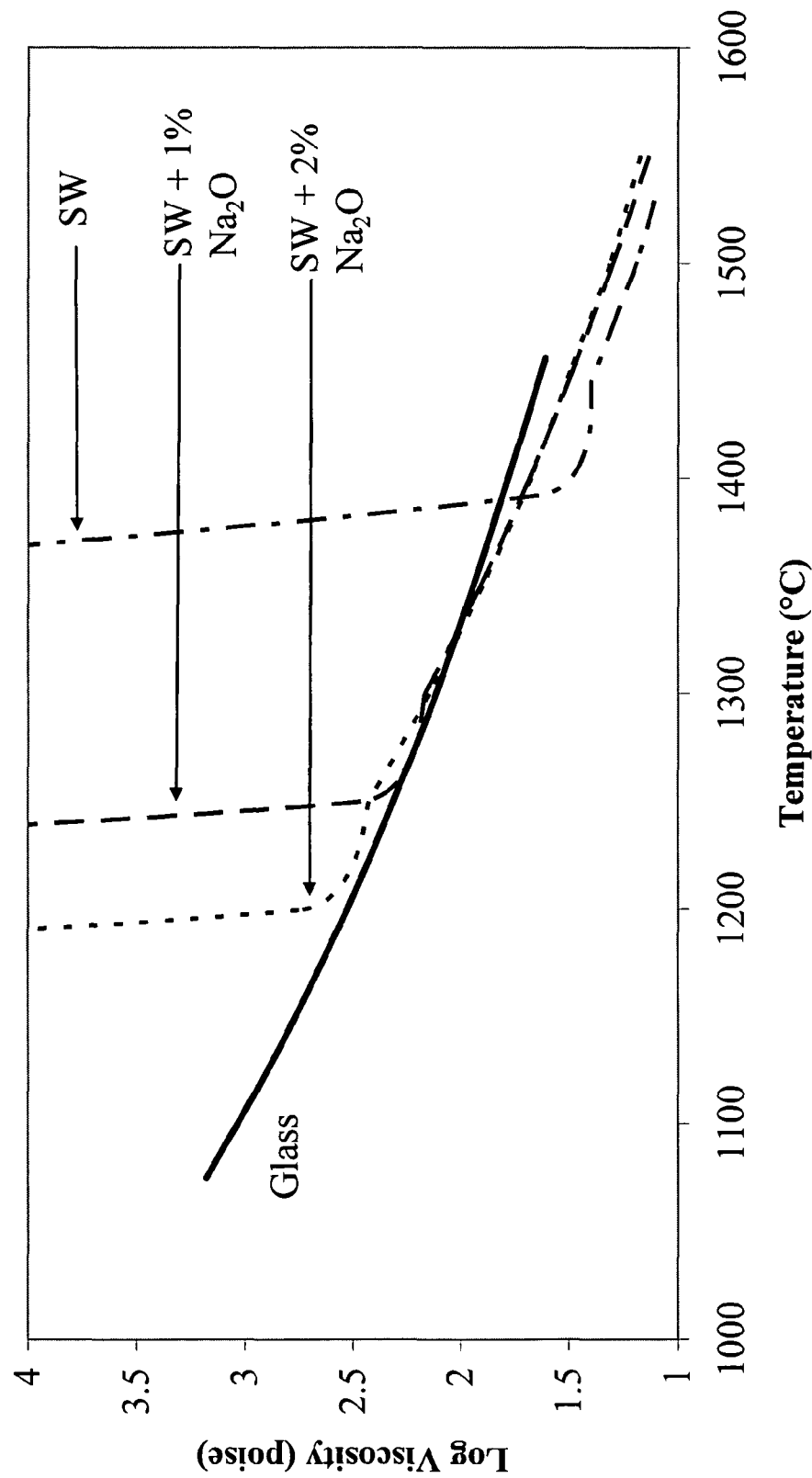
FIG. 3 is a graph of experimentally determined temperatureviscosity curves for a range of compositions.

The purpose of adding alkali metal is to try to alter the viscosity temperature curve for alkaline earth silicates so as to provide a more useful working range for the silicates. FIG. 3 shows a graph experimental viscositytemperature curves for:— a high soda glass having the approximate composition in wt %:—

| | |
|---|---|
| SiO$_2$ | 68 |
| Na$_2$O | 13.4 |
| CaO | 7.94 |
| B$_2$O$_3$ | 4.74 |
| MgO | 2.8 |
| Al$_2$O$_3$ | 2.66 |
| Fe$_2$O$_3$ | 1.17 |
| TiO$_2$ | 0.09 |
| ZrO$_2$ | 0.08 |
| Cr$_2$O$_3$ | 0.06 | an alkaline earth silicate melt comprising the approximate composition:—
CaO 29
MgO 6%
SiO$_2$ 64.5
+others to 100%
and the same alkaline earth silicate melt comprising respectively 1 wt % Na$_2$O and 2 wt % Na$_2$O as an additive.

The viscositytemperature graph of the high soda glass is a smooth line rising as temperature falls.

For the known alkaline earth silicate melt (SW) the viscosity is lower and then rises steeply at a critical temperature value (this is shown as a slope in the graph but that is an artefact of the graphing process—it actually represents a much steeper change).

Addition of Na$_2$O to the melt moves this rise in viscosity to lower temperatures.

This extends the working range of the melt so that it becomes less dependent upon temperature so increasing the tolerance of the melt to fibre forming conditions. Although the melt stream temperature is important, the melt cools rapidly during the fibre forming process and so a longer range of workability for the composition improves fibre formation. The addition of the alkali metal oxides may also serve to stabilise the melt stream so that for a given set of conditions there is an amount that reduces shot.

Additionally, it is surmised that in small quantities the alkali metal oxides serve to suppress phase separation in alkaline earth silicate fibres.

Since the alkaline earth silicate systems have a two liquid region in their phase diagrams, the applicants suspect that addition of alkali metal oxides may move the melts out of a two-liquid region into a single phase region.

The addition also has the effect of lowering melt stream temperature which may assist in stability.

The effectiveness of these measures is also shown by the amount of shot present in the finished material. In the fibre forming process, droplets of melt are rapidly accelerated (by being flung off a spinning wheel or being blasted by a jet of gas) and form long tails which become the fibres.

However that part of the droplets that does not form fibre remains in the finished material in the form of particles known in the industry as "shot". Shot is generally detrimental to the thermal properties of insulation formed from the fibres, and so it is a general aim in the industry to reduce the quantity of shot.

Figure 4:
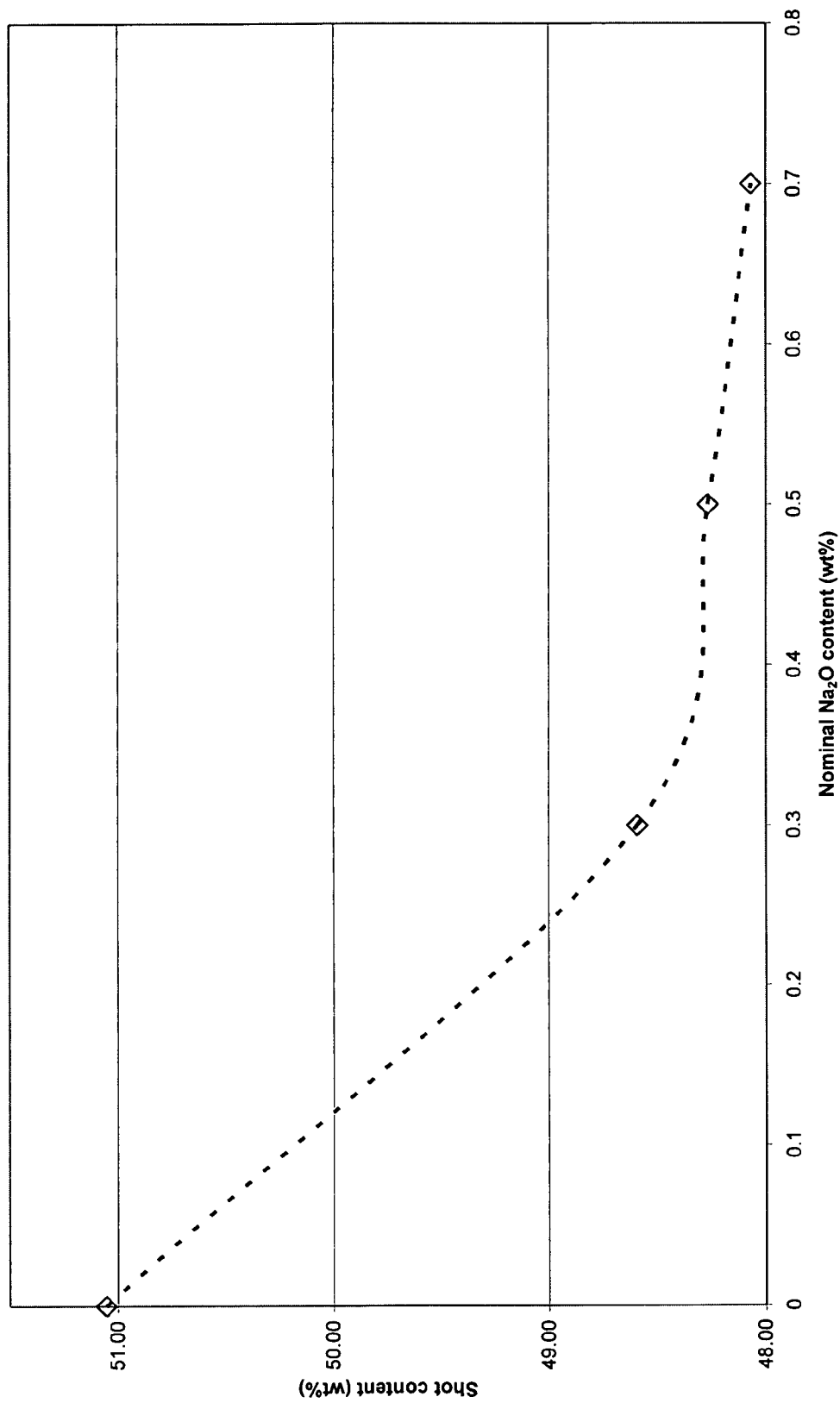
FIG. 4 is a graph showing shot content plotted against $Na_2O$ content for the fibres of FIG. 1

The applicants have found that addition of minor amounts of alkali metal to the melt has the effect of reducing the amount of shot, and this is shown in FIG. 4 for the lanthanum containing materials of Table 1, where it can be seen that the shot content was reduced from ~51% to ~48%.

Similar effects apply to lanthanum free materials. Table 5 shows the analysed compositions of a range of alkaline earth silicate fibres (having a lower maximum use temperature) made in accordance with the compositions of WO9315028, which were made by spinning using a melt stream temperature of 1380-1420° C., and with a pair of rotating spinners.

Figure 5:
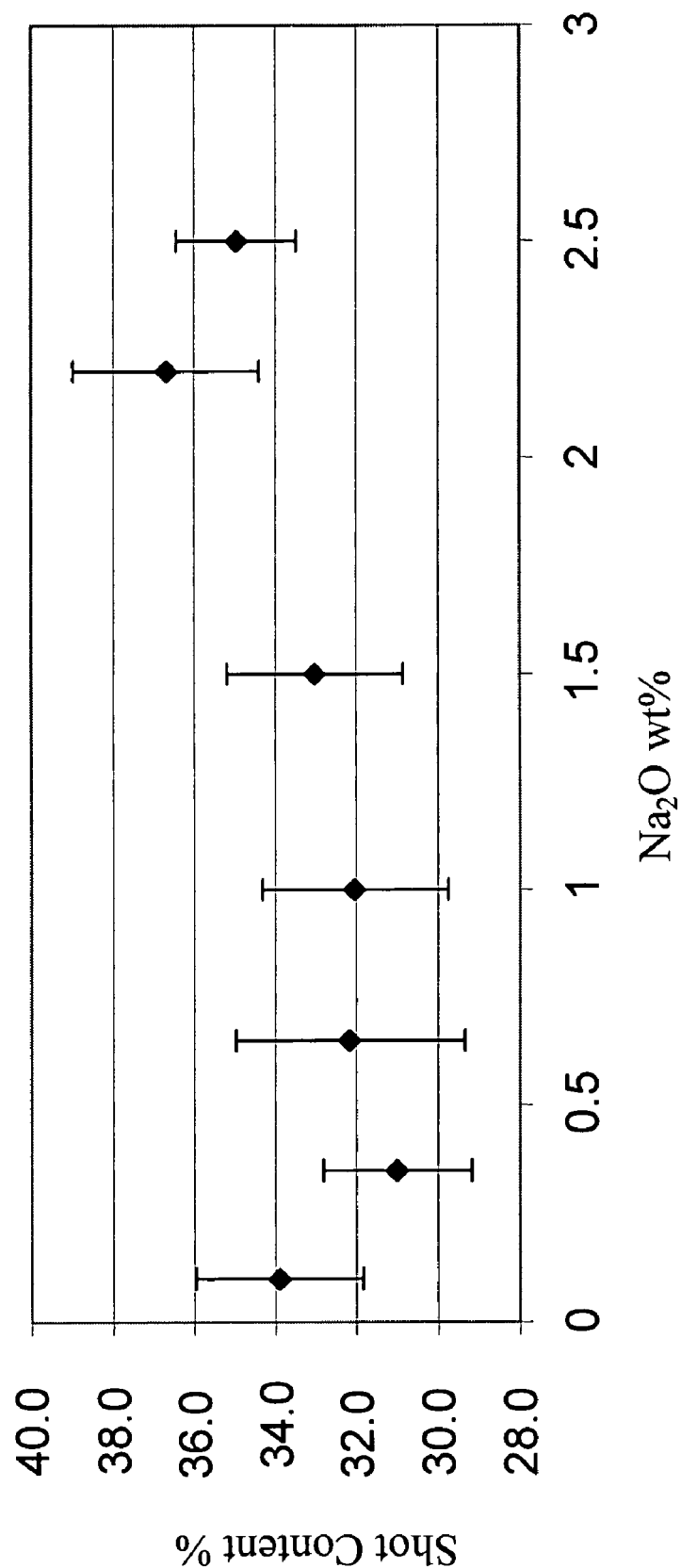
FIG. 5 is a graph of shot content against $Na_2O$ content for a different range of alkaline earth silicate fibres

FIG. 5 shows experimentally determined shot contents with error bars indicating one standard deviation about mean. It can be seen that in the range 0.35 to 1.5 wt % $Na_2O$, there is a statistical improvement in the shot content as a result of the addition. In particular, a 3% reduction in shot for a 0.35 wt % soda content is significant.

Since there seems no detrimental effect on shrinkage at such levels (and indeed a slight improvement) it can be seen that addition of alkali metal oxides is beneficial for the production of such materials.

TABLE 5

| Sample | 04-C43-1 | 04C56-7 | 04C46-5 | 04C47-2 | 04C51-6 | 04C50-8 | 04C49-6 |
|---|---|---|---|---|---|---|---|
| Component | | | | | | | |
| $Na_2O$ | 0.11 | 0.35 | 0.66 | 1.01 | 1.47 | 2.03 | 2.46 |
| MgO | 4.78 | 5.90 | 5.18 | 5.47 | 5.71 | 5.76 | 6.20 |
| $Al_2O_3$ | 1.07 | 0.40 | 0.35 | 0.27 | 0.30 | 0.36 | 0.30 |
| $SiO_2$ | 65.1 | 65.16 | 65.07 | 64.96 | 65.91 | 66.15 | 65.24 |
| $P_2O_5$ | 0 | 0.00 | 0.00 | 0.00 | 0.00 | 0.00 | 0.00 |
| $K_2O$ | 0.08 | 0.08 | 0.08 | 0.07 | 0.07 | 0.07 | 0.07 |
| CaO | 28.92 | 27.84 | 28.47 | 28.12 | 26.25 | 25.36 | 24.79 |
| $TiO_2$ | 0.02 | 0.02 | 0.03 | 0.01 | 0.02 | 0.03 | 0.02 |
| $Cr_2O_3$ | 0.02 | 0.02 | 0.02 | 0.02 | 0.02 | 0.02 | 0.02 |
| $Mn_3O_4$ | 0.03 | 0.03 | 0.03 | 0.03 | 0.03 | 0.03 | 0.03 |
| $Fe_2O_3$ | 0.2 | 0.19 | 0.19 | 0.18 | 0.18 | 0.18 | 0.18 |
| ZnO | 0 | 0.00 | 0.00 | 0.00 | 0.00 | 0.01 | 0.00 |
| SrO | 0.01 | 0.01 | 0.01 | 0.01 | 0.01 | 0.01 | 0.01 |
| $ZrO_2$ | 0 | 0.00 | 0.00 | 0.00 | 0.00 | 0.00 | 0.00 |
| BaO | 0 | 0.00 | 0.00 | 0.00 | 0.00 | 0.00 | 0.00 |
| $HfO_2$ | 0 | 0.00 | 0.00 | 0.00 | 0.00 | 0.00 | 0.00 |
| PbO | n/a | n/a | n/a | n/a | n/a | n/a | n/a |
| $SnO_2$ | n/a | n/a | n/a | n/a | n/a | n/a | n/a |
| CuO | n/a | n/a | n/a | n/a | n/a | n/a | n/a |
| % Linear Shrinkage | | | | | | | |
| 1000° C./24 hours | 1.42 | 1.33 | 1.54 | | | 4.18 | |
| 1100° C./24 hours | 1.39 | 1.20 | 1.77 | | | 4.85 | |

Addition of the alkali metal should be at levels that do not excessively detrimentally affect other properties of the fibre (e.g. shrinkage), but for different applications what is "excessive" will vary.

The fibres can be used in thermal insulation and may form either a constituent of the insulation (e.g. with other fibres andor fillers andor binders) or may form the whole of the insulation. The fibres may be formed into blanket form insulation.

Figure 8:
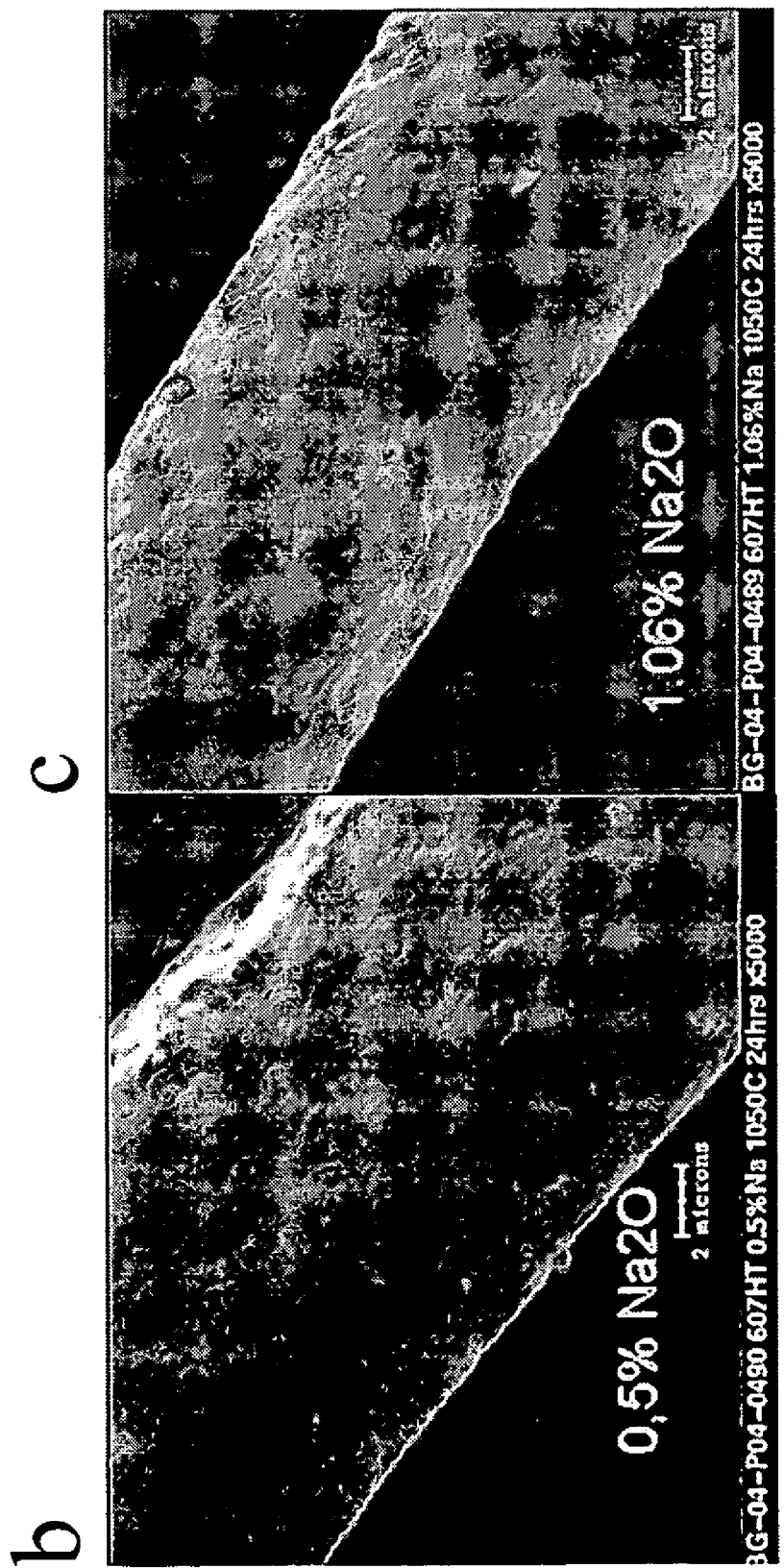

Although initial work was primarily related to the addition of $Na_2O$ to alkaline earth silicate fibres, the applicants discovered that when $Na_2O$ was used as the additive to high calcium—low magnesium fibres it had a tendency to promote crystallisation (and hence powderiness of the fibres) after exposure to temperatures of ~1000° C. This can be seen in FIG. 8 in which fibre a)-e) had base compositions falling in the region:—

| | | |
|---|---|---|
| $SiO_2$ | 72–75 | wt % |
| CaO | 22–26.5 | wt % |
| MgO | 0.4–1 | wt % |
| $Al_2O_2$ | <0.3 | wt % |
| $La_2O_3$ | 1.2–1.5 | wt % |

Fibres a), b) and c) show the effect on surface appearance of fibres after exposure to 1050° C. for 24 hours on fibres containing increasing amounts of $Na_2O$ (from ~0 through 0.5 wt % to 1.06 wt % respectively). As can be seen, the fibre absent $Na_2O$ has a smooth appearance indicating little crystallisation, whereas increasing $Na_2O$ leads to an increase in surface roughness indicative of crystallisation.

In contrast, fibres d) and e) show that at 1100° C. a fibre containing ~0.5 wt % K2O is little different from a fibre free of $K_2O$, and only starts to show slight surface roughness at 1150° C.

Figure 9:
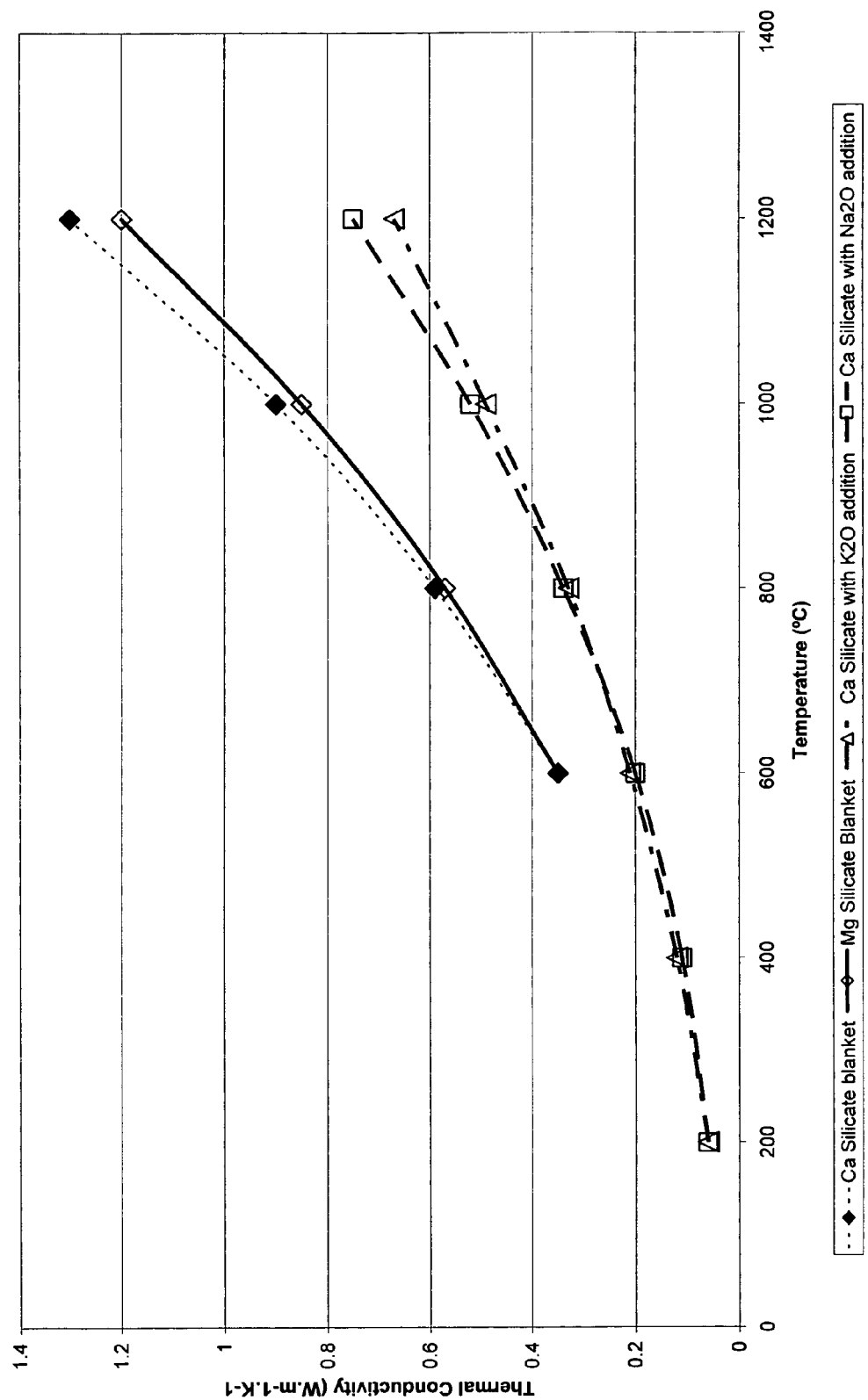
FIG. 9 is a graph comparing measured thermal conductivities for a range of fibres.

Table 6 shows relative thermal conductivities of blankets having approximate density of 96 kg.m$^{-3}$ formed from fibres having the principal ingredients shown. It also shows thermal conductivities of these blankets and these figures are shown in FIG. 9. It can be seen that addition of $Na_2O$ and $K_2O$ seems to result in lower thermal conductivity from the blankets so showing improved insulating ability.

TABLE 6

| | Ca Silicate blanket | Mg Silicate Blanket | Ca Silicate with $K_2O$ addition | Ca Silicate with $Na_2O$ addition |
|---|---|---|---|---|
| $Na_2O$ | 0.22 | 0 | 0 | 1.06 |
| MgO | 0.4 | 19.13 | 0.74 | 0.96 |
| $Al_2O_3$ | 0.79 | 1.58 | 0.15 | 0.13 |
| $SiO_2$ | 73.94 | 79.08 | 74.7 | 72.1 |
| $K_2O$ | 0.06 | 0 | 0.75 | 0 |
| CaO | 22.69 | 0.25 | 22.3 | 24.5 |
| $TiO_2$ | 0 | 0.06 | 0 | 0 |
| $Fe_2O_3$ | 0.16 | 0.38 | 0.04 | 0 |
| $La_2O_3$ | 2.07 | NA | 1.36 | 1.26 |
| Temperature ° C. | Thermal Conductivity (w · m$^{-1}$ · K$^{-1}$) | | | |
| 200 | | | 0.06 | 0.06 |
| 400 | | | 0.12 | 0.11 |
| 600 | 0.35 | 0.35 | 0.21 | 0.2 |
| 800 | 0.59 | 0.57 | 0.33 | 0.34 |
| 1000 | 0.9 | 0.85 | 0.49 | 0.52 |
| 1200 | 1.3 | 1.2 | 0.67 | 0.75 |

The applicants have therefore identified further advantages of the use of alkali metal oxides as additives to alkaline earth silicate blanket materials, and particular advantage to the use of potassium. In particular, to avoid promotion of crystallisation by sodium, preferably at least 75 mol % of the alkali metal is potassium. More preferably at least 90%, still more preferably at least 95% and yet still more preferably at least 99% of the alkali metal is potassium.

To test the mutual interaction of $La_2O_3$ and $K_2O$ on the fibre properties a range of fibres were made into blankets and tested for shrinkage at various temperatures [24 hours at temperature].

It was found that $La_2O_3$ could be reduced and replaced by $K_2O$ without significant harm to the shrinkage properties of the materials, but this led to onset of crystallisation at lower temperatures than for the $La_2O_3$ containing materials. However, replacement of $La_2O_3$ in part by alumina cured this problem. Table 7 indicates a range of materials tested, the temperature at which crystallisation commenced, and temperature at which the crystals reached ~1 μm in size. The materials all had a base composition of approximately 73.1-74.4 wt % $SiO_2$ and 24.6-25.3 wt % CaO with all other ingredients amounting to less than 3% in total.

| Composition | Crystallisation Starts @ ° C. | Crystals Coarsen ~1 mm @ ° C. |
|---|---|---|
| CaO—SiO2—La2O3 (1.3%) | 1100 | 1200 |
| CaO—SiO2—$K_2O$ (0.75%) | 1000 | 1100 |
| CaO—SiO2—$K_2O$ (0.75%)—$La_2O_3$ (1.3%) | 1050 | 1150 |
| CaO—SiO2—$K_2O$ (0.75%)—$La_2O_3$ (1.3%) | 1050 | 1150 |
| CaO—SiO2—$K_2O$ (0.8%)—$La_2O_3$ (0.4%) | 1050 | 1200 |
| CaO—SiO2—$K_2O$ (0.6%)—$La_2O_3$ (0.15%)—$Al_2O_3$ (0.94%) | 1100 | 1200 |

Accordingly, a preferred range of compositions comprises:—
72%<$SiO_2$<79%
MgO<10%
13.8%<CaO<27.8%
$Al_2O_3$<2%
$ZrO_2$<3%
$B_2O_3$<5%
$P_2O_5$<5%
95%<$SiO_2$+CaO+MgO+$Al_2O_3$+$ZrO_2$+$B_2O_3$+$P_2O_5$
$M_2O$>0.2% and <1.5% in which M is alkali metal of which at least 90 mol % is potassium.

More preferably $SiO_2$ plus CaO>95%, and usefully a preferred range of compositions comprises:—
72%<$SiO_2$<75%
MgO<2.5%
24%<CaO<26%
0.5%<$Al_2O_3$<1.5%
$ZrO_2$<1%
$B_2O_3$<1%
$P_2O_5$<1%
$M_2O$>0.2% and <1.5% in which M is alkali metal of which at least 90 mol % is potassium.

A particularly preferred range is
$SiO_2$ 74±2%
MgO<1%
CaO 25±2%
$K_2O$ 1±0.5%
$Al_2O_3$<1.5%
98%<$SiO_2$+CaO+MgO+$Al_2O_3$+$K_2O$ And these preferred ranges may comprise additionally $R_2O_3$<0.5 wt % where R is selected from the group Sc, La, Ce, Pr, Nd, Sm, Eu, Gd, Tb, Dy, Ho, Er, Tm, Yb, Lu, Y or mixtures thereof.

During further trials a second range of fibres was found that gave good results. These fibres had the composition:—
$SiO_2$=67.8-70%
CaO=27.2-29%
MgO=1-1.8%
$Al_2O_3$=<0.25%
$La_2O_3$=0.81-1.08%
$K_2O$=0.47-0.63%

These fibres had a high strength (80-105 kPa for a blanket of thickness ~25 mm and density ~128 kg·m$^3$) and and low shot content (~41% total shot).

The fibres may also be used in other applications where alkaline earth silicate fibres are currently employed (e.g. as constituents of friction materials).

The invention claimed is:

1. Fibres having the composition in weight percent
65%<$SiO_2$<86%
MgO<10%
13.5%<CaO<27.5%
$Al_2O_3$<2%
$ZrO_2$<3%
$B_2O_3$<5%
$P_2O_5$<5%
72%<$SiO_2$+$ZrO_2$+$B_2O_3$+5*$P_2O_5$
95%<$SiO_2$+CaO+MgO+$Al_2O_3$+$ZrO_2$+$B_2O_3$+$P_2O_5$
0.2%<$M_2O$<1.5%
in which M is alkali metal and in which at least 75 mol % of the alkali metal is potassium and soluble in physiological saline solution to give non-toxic dissolved components.

2. Fibres, as claimed in claim 1, in which $SiO_2$>72 wt %.

3. Fibres, as claimed in claim 2, in which:
0.5 wt %<$M_2O$ <1.5 wt %.

4. Fibres having the composition in weight percent
75%<$SiO_2$<86%
MgO<10%
13.8%<CaO<27.8%
$Al_2O_3$<2%
$ZrO_2$<3%
$B_2O_3$<5%
$P_2O_5$<5%
75%<$SiO_2$+$ZrO_2$+$B_2O_3$+5*$P_2O_5$
95%<$SiO_2$+CaO+MgO+$Al_2O_3$+$ZrO_2$+$B_2O_3$+$P_2O_5$
0.2%<$M_2O$<1.5%
in which M is alkali metal and in which at least 75 mol % of the alkali metal is potassium and soluble in physiological saline solution to give non-toxic dissolved components.

5. Fibres, as claimed in claim 2, in which:
97.5 wt %<$SiO_2$+CaO+MgO+$Al_2O_3$+$ZrO_2$+$B_2O_3$+$P_2O_5$+$M_2O$.

6. Fibres, as claimed in claim 2, comprising additionally
0.1 wt %<$R_2O_3$<4 wt %
where R is selected from the group Sc, La, Ce, Pr, Nd, Sm, Eu, Gd, Tb, Dy, Ho, Er, Tm, Yb, Lu, Y or mixtures thereof.

7. Fibres as claimed in claim 2, in which at least 90 mol % of the alkali metal is potassium.

8. Fibres as claimed in claim 2, in which at least 95 mol % of the alkali metal is potassium.

9. Fibres as claimed in claim 2, in which at least 99 mol % of the alkali metal is potassium.

10. Fibres, as claimed in claim 2, in which the alkali metal is present in an amount greater than or equal to 0.3 mol %.

11. Fibres, as claimed in claim 10, in which the alkali metal is present in an amount greater than or equal to 0.4 mol %.

12. Fibres, as claimed in claim 11, in which the alkali metal is present in an amount greater than or equal to 0.5 mol %.

13. Fibres, as claimed in claim 12, in which the alkali metal is present in an amount greater than or equal to 0.6 mol %.

14. Fibres, as claimed in claim 2, in which the amount of MgO is less than 2 wt %.

15. Fibres as claimed in claim 2 having the composition in weight percent
72%<$SiO_2$<79%
MgO<10%
13.8%<CaO<27.8%
$Al_2O_3$<2%
$ZrO_2$<3%
$B_2O_3$<5%
$P_2O_5$<5%
95%<$SiO_2$+CaO+MgO+$Al_2O_3$+$ZrO_2$+$B_2O_3$+$P_2O_5$
$M_2O$>0.2% and <1.5%
in which M is alkali metal of which at least 90 mol % is potassium.

16. Fibres as claimed in claim 15 in which $SiO_2$ plus CaO>95%.

17. Fibres as claimed in claim 16, having the composition in weight percent
72%<$SiO_2$<75%
MgO<2.5%
24%<CaO<26%
0.5%<$Al_2O_3$<1.5%
$ZrO_2$<1%
$B_2O_3$<1%
$P_2O_5$<1%
$M_2O$>0.2% and <1.5%
in which M is alkali metal of which at least 90 mol % is potassium.

18. Fibres as claimed in claim 15, having the composition in weight percent:—
$SiO_2$ 74±2%
MgO<1%
CaO 25±2%
$K_2O$ 1±0.5%
$Al_2O_3$<1.5%
98%<$SiO_2$+CaO+MgO+$Al_2O_3$+$K_2O$.

19. Fibres as claimed in any one of claims 15, comprising additionally
$R_2O_3$ <0.5 wt %
where R is selected from the group Sc, La, Ce, Pr, Nd, Sm, Eu, Gd, Tb, Dy, Ho, Er, Tm, Yb, Lu, Y or mixtures thereof.

20. Fibres having the composition in wt %:
$SiO_2$ =72-86%
CaO=27.2-29%
MgO=1-1.8%
$Al_2O_3$=<0.25%
$La_2O_3$=0.81-1.08%
$K_2O$=0.47-0.63%
and soluble in physiological saline solution to give non-toxic dissolved components.

21. Thermal insulation comprising fibres as claimed in claim 2.

22. Thermal insulation, as claimed in claim 21, in the form of a blanket.

23. Fibres, as claimed in claim 2, in which $M_2O$ is present in an amount less than 1 mol %.

24. Fibres, as claimed in claim 23, in which $M_2O$ is present in an amount less than 0.75 mol %.

25. Fibres having the composition in weight percent
72%<$SiO_2$ <86%
MgO<10%
13.5%<CaO<27.5%
$Al_2O_3$ <2%
$ZrO_2$ <3%
$B_2O_3$ <5%
$P_2O_5$ <5%
$SiO_2$ plus CaO>95%
0.5%<$M_2O$<1.5%
in which M is alkali metal and in which at least 75 mol % of the alkali metal is potassium and soluble in physiological saline solution to give non-toxic dissolved components.

26. Fibres having the composition in weight percent
72%<$SiO_2$<86%>
MgO<10%
13.5%<CaO<27.5%
$Al_2O_3$<2%
$ZrO_2$<1%
$B_2O_3$<5%
$P_2O_5$<5%
$SiO_2$ plus CaO>95%
0.2%<$M_2O$<1.5%
97.5%<$SiO_2$+CaO+MgO+$Al_2O_3$+$ZrO_2$+$B_2O_3$+$P_2O_5$
in which M is alkali metal and in which at least 75 mol % of the alkali metal is potassium and soluble in physiological saline solution to give non-toxic dissolved components.

* * * * *